United States Patent [19]

Tokuda et al.

[11] Patent Number: 5,539,668

[45] Date of Patent: Jul. 23, 1996

[54] OPTICAL SWITCHING APPARATUS

[75] Inventors: Yasunori Tokuda; Yuji Abe, both of Hyogo; Shigetoshi Nara, Okayama, all of Japan

[73] Assignee: Mitsubishi Denki Kabushiki Kaisha, Tokyo, Japan

[21] Appl. No.: 218,374

[22] Filed: Mar. 28, 1994

[30] Foreign Application Priority Data

Jul. 30, 1993 [JP] Japan .................................. 5-190644

[51] Int. Cl.$^6$ .................................................. G06F 1/00
[52] U.S. Cl. ........................... 364/525; 257/458; 364/713
[58] Field of Search .............................. 257/21, 84, 458; 359/243; 364/525, 713

[56] References Cited

U.S. PATENT DOCUMENTS

| | | | |
|---|---|---|---|
| Re. 32,893 | 3/1989 | Miller | 257/458 X |
| 4,546,244 | 10/1985 | Miller | 359/243 X |
| 4,630,898 | 12/1986 | Jewell | 359/243 |
| 4,716,449 | 12/1987 | Miller | 257/21 |
| 4,751,378 | 6/1988 | Hinton et al. | 377/102 X |
| 4,754,132 | 6/1988 | Hinton et al. | 377/102 X |
| 4,764,889 | 8/1988 | Hinton et al. | 364/713 X |
| 4,764,890 | 8/1988 | Hinton | 364/713 X |
| 5,144,397 | 9/1992 | Denki | 357/30 |
| 5,260,586 | 11/1993 | Kondoh et al. | 257/84 |

OTHER PUBLICATIONS

"Complex Multistable Responses of Serially Connected Optical . . ." Applied Physics Letters 59 Aug. 26, 1991, pp. 1016–1018.

"Dual–Wavelength Multiple Quantum Well n–i–p–i–n Photodetector . . ." Applied Physics Letters 56 Jan. 15, 1990, pp. 227–229.

"Symmetric Self–Electro–Optic Effect Device: Optical Set–Reset . . ." Applied Physics Letters 52 Apr. 25, 1988, pp. 1419–1421.

"Novel Hybrid Optically Bistable Switch: The Quantum Well . . ." Applied Physics Letters 45 Jul. 1, 1984, pp. 13–15.

*Primary Examiner*—Edward R. Cosimano
*Attorney, Agent, or Firm*—Wolf, Greenfield & Sacks

[57] ABSTRACT

A light transmission circuit 20 is biased to one optical bistable region of its multistable characteristic by a bias light from a light source 29. The bias light is superimposed by plural control pulse lights, and the superimposed light is irradiated. If the light intensity of the bias light exceeds a predetermined turning point according to the light intensity of the control pulse light, the state of multiple quantum well layers 4 and 24 are changed. Then, the light transmission state of the light transmission circuit 20 changes. Hereby, after the control pulse light disappeared, the bias light is detected by a light-receiving device 30 in a different transmission state from the prior state. And, the transmission state returns to the original state by selecting suitable light intensities of the control pulse lights to be superimposed. Therefore the light transmission circuit 20 can be switched reversibly.

23 Claims, 16 Drawing Sheets

| INPUT | A | 0 | 0 | 1 | 1 | OPERATION NAME AND |
|---|---|---|---|---|---|---|
|  | B | 0 | 1 | 0 | 1 | USED PULSE NAME |
| OPERATION RESULTS | INITIAL STATE IS 1 | 1 | 1 | 1 | 0 | NAND USING $\alpha$ |
|  |  | 1 | 0 | 0 | 0 | NOR USING $\beta$ |
|  |  | 1 | 0 | 0 | 1 | EQUIVALENT USING $\gamma$ |
|  | INITIAL STATE IS 0 | 0 | 0 | 0 | 1 | AND USING $\gamma$ |
|  |  | 0 | 1 | 1 | 1 | OR USING $\delta$ |

| INPUT | A | 0 | 0 | 1 | 1 | OPERATION NAME AND USED PULSE NAME |
|---|---|---|---|---|---|---|
| | B | 0 | 1 | 0 | 1 | |
| OPERATION RESULTS | INITIAL STATE IS 1 | 0 | 0 | 0 | 1 | AND USING $\alpha$ |
| | | 0 | 1 | 1 | 1 | OR USING $\beta$ |
| | | 0 | 1 | 1 | 0 | EXCLUSIVE−OR USING $\gamma$ |
| | INITIAL STATE IS 0 | 1 | 1 | 1 | 0 | NAND USING $\gamma$ |
| | | 1 | 0 | 0 | 0 | NOR USING $\delta$ |

| WHEN BIAS LIGHT INTENSITY IS $P_{B1}$ ||  |
|---|---|---|
| INPUT || OUTPUT |
| $P_1$ | $P_2$ |  |
| 0 | 0 | 1 |
| 0 | 1 | 0 |
| 1 | 0 | 0 |
| 1 | 1 | 1 |

EQUIVALENT LOGIC
FIG.18 (a)

| WHEN BIAS LIGHT INTENSITY IS $P_{B2}$ ||  |
|---|---|---|
| INPUT || OUTPUT |
| $P_1$ | $P_2$ |  |
| 0 | 0 | 0 |
| 0 | 1 | 1 |
| 1 | 0 | 1 |
| 1 | 1 | 0 |

EXCLUSIVE−OR
FIG.18 (b)

| WHEN BIAS LIGHT INTENSITY IS $P_{B1}$ ||  |
|---|---|---|
| INPUT || OUTPUT |
| $P_1$ | $P_2$ |  |
| 0 | 0 | 0 |
| 0 | 1 | 1 |
| 1 | 0 | 1 |
| 1 | 1 | 0 |

EXCLUSIVE−OR
FIG.20 (a)

| WHEN BIAS LIGHT INTENSITY IS $P_{B2}$ ||  |
|---|---|---|
| INPUT || OUTPUT |
| $P_1$ | $P_2$ |  |
| 0 | 0 | 1 |
| 0 | 1 | 0 |
| 1 | 0 | 0 |
| 1 | 1 | 1 |

EQUIVALENT LOGIC
FIG.20 (b)

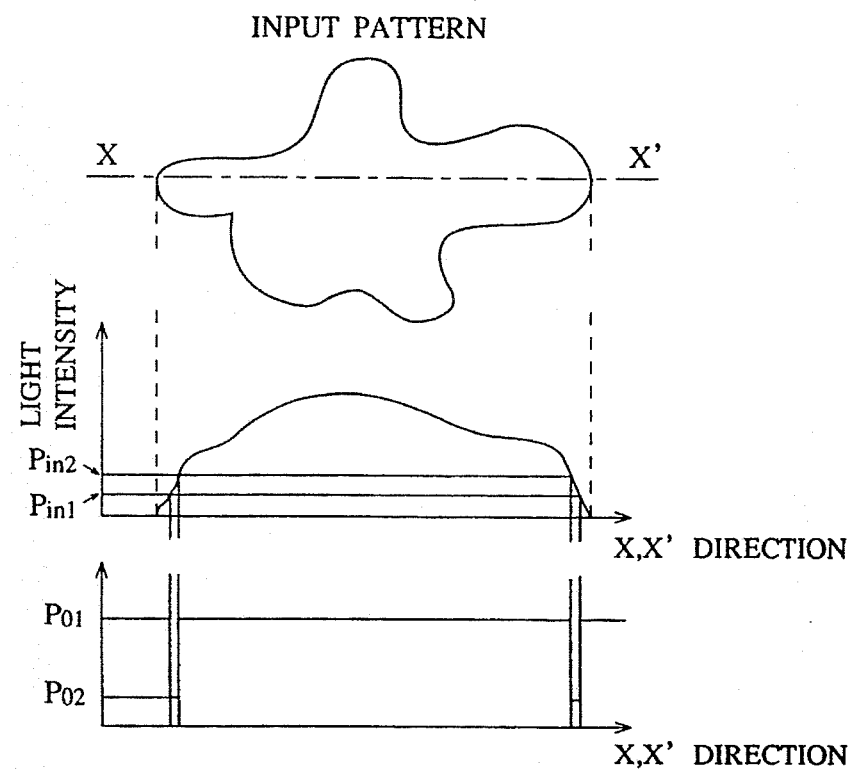
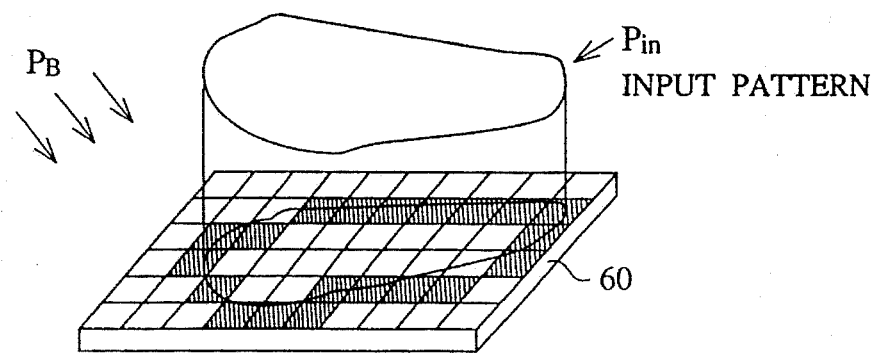

OPTICAL SWITCHING APPARATUS

BACKGROUND OF THE INVENTION

1. Field of the Invention

The present invention generally relates to an optical switching apparatus, and more particularly to an optical switching apparatus profitable for application to, for example, information processors and picture processors.

2. Description of the Prior Art

FIG. 31 is a drawing showing a conventional optical switch depicted in, for example, "Applied Physics Letters", vol. 45, p.13 (1984), etc. In FIG. 31, reference numeral 1 denotes a p-i-n type device formed by interposing an intrinsic semiconductor region 5, having a semiconductor quantum well layer 4, between a p type semiconductor layer 2 and an n type semiconductor layer 3. Numeral 6 denotes an external electric power supply imposing a predetermined inverse voltage V to the optical bistable device 1. The negative terminal of a direct current power source 7 in the power supply 6 is connected to the p type semiconductor layer 2 of the optical bistable device 1, and the positive terminal of it is connected to the n type semiconductor layer 3 through an electric resistor 8 having the resistance value R. Numeral 9 denotes a light source making an incident light Pin having a predetermined wave length incidence from the side of the p type semiconductor layer 2 of the optical bistable device 1. Numeral 10 denotes a light-receiving device receiving transmission light having been transmitted through the n type semiconductor 3 of the optical bistable device 1. FIG. 32 is a drawing showing a characteristic of the transmission light Pout when the incident light Pin whose intensity is varied is supplied to the optical bistable device 1, that is, a bistable characteristic of the optical bistable device 1. In FIG. 32, numeral 11 denotes an optical bistable region where the transmission light Pout having been transmitted through the optical bistable device 1 can take two transmission states, namely, a high transmission state a and a low transmission state b.

Next, the operation of the conventional optical switching apparatus will be described. The conventional optical switching device is constructed as described above, and a photoelectric current I does not flow in the state where the light is not incident, so the inverse bias voltage V is impressed on the device 1 almost as it is. Now, the semiconductor quantum well layer 4 provided in the device 1 has a sharp absorption peak because of the excitor absorption corresponding to transitions between quantum levels. And, this absorption peak wavelength shifts to the long wavelength side by impressing the inverse bias voltage on the device.

When an incident light Pin having a shorter wavelength than the excitor absorption peak wavelength is supplied to the device 1 from the light source 9, the incident light Pin is transmitted through the device 1 to the side of the n-type semiconductor layer 3 in a high transmitting state (for example, the "a" state of FIG. 32) up to a certain level of incident light intensity (for example, up to the light intensity Pb of FIG. 32), since the amount of light absorbed in the semiconductor quantum well layer 4 is small. Hereby, the light-receiving device 10 receives the light Pout transmitted in a high transmitting state. Hereinafter, such a state, that is to say, the high transmitting state in the optical bistable region, is defined as an ON state.

Next, the positive feedback explained below in detail is generated by further increasing the incident light Pin (the "c" point of FIG. 32). The incident light Pin is absorbed in the semiconductor quantum well layer 4, and the photoelectric current I flows, the amount of which is almost in proportion to the absorption amount. Thereupon, a voltage drop is generated at the electric resistor 8 by the photoelectric current I, then the inverse bias voltage impressed on the device 1 decreases from V to V-IR. The excitor absorption peak wavelength of the semiconductor quantum well layer 4 shifts to the shorter wavelength side and approaches to the wavelength of the incident light Pin by the decrease of the inverse bias voltage impressed on the device 1. Therefore, the light amount absorbed in the semiconductor quantum well layer 4 increases, and the photoelectric current I flowing in the device 1 also increases according to it. Thereupon, the inverse bias voltage impressed on the device 1 decreases the more, then the excitor absorption peak wavelength in the semiconductor quantum well layer 4 shifts to the shorter wavelength side and approaches closer to the wavelength of the incident light Pin. Owing to such the feedback, the light absorption amount absorbed in the semiconductor quantum well layer 4 rapidly increases, and the intensity of the light Pout transmitted through the device 1 rapidly decreases as shown in the "c" point of FIG. 32. The low transmitting state is kept even if the intensity of the incident light Pin from the light source 9 is returned to the light intensity Pb, and the transmitting state moves to the "b" point. Then the light-receiving device 10 receives the light Pout transmitted in the low transmitting state. Hereinafter, such state, that is to say, the low transmitting state in the optical bistable region is defined as an OFF state.

Next, when the incident light intensity of the light Pin is decreased smaller than the bistable region 11 by decreasing the output of the light source 9, the inverse processes to those mentioned above are generated, and the device 1 transfers from the low transmitting state to the high transmitting state. As a result, the light Pout transmitted in the high transmitting state of light is detected by the light-receiving device 10, and the device 1 turns to the ON state, by returning the intensity of the incident light Pin from the light source 9 to the device 1 to the light intensity Pb.

Because the transmission light Pout of the optical bistable device 1 takes two transmission states a and b to a certain incident light Pin's intensity as explained above, the optical bistable device 1 is greatly expected to be used as optical memories of optical information processors, optical logic circuits, and so forth, by utilizing the characteristic capable of switching the two states freely.

Because the conventional optical switching apparatus has the construction above described, it cannot perform the reversible switching of the two light transmission states only by imposing purely optical pulses to the apparatus, and this makes it difficult to control the light source 9 on the occasion of using it in such high speed circuits as optical information processors. Namely, in case of changing the optical bistable device 1 from the high transmission state a to the low transmission state b, it is needed to make the device 1 be in the state of the bistable region 11 by imposing the bias light Pb, and further make the device 1 be in the off state by superimposing the positive trigger pulse light Pb exceeding the bistable region 11. However, a negative pulse light making the optical bistable device 1 be in the state under the optical bistable state 11 is needed in case of changing it from the low transmission state b to the high transmission state a. Hereby, the conventional optical switching apparatus cannot attain whole light type switches using only purely optical pulses.

SUMMARY OF THE INVENTION

It is therefore an object of the present invention to overcome the above described drawbacks and disadvantages and to provide an optical switching apparatus for switching plural light transmission states reversibly using only purely optical pulses.

Another object of the invention is to obtain an optical logic operation circuit for performing logical operations by applying the reversible switches using only purely optical pulses effectively.

A further object of the invention is to obtain a processing apparatus capable of effective picture processing using plural optical switching apparatus.

In carrying out the present invention and according to one aspect thereof, there is provided an optical switching apparatus comprised as follows.

In the optical switching apparatus of the invention, a bias light produced by an incident-light-producing means transmits a light transmission means in either light transmission state of an optical bistable region in the light transmission means to be received by a light-receiving means. When the bias light is superimposed a control pulse light produced by the incident-light-producing means and the light intensity of which exceeds the optical bistable region, the light transmission means changes to the different transmission state, and the transmission light is received by the light-receiving means in this transmission state. Hereby, a change of the transmission state can be detected. Further, if the bias light is superimposed by plural control pulse lights, and the intensity of it reaches to e.g. next optical bistable state, the light transmission state of the light transmission means transfers to a different region when the control pulse lights disappear, then the light transmission means transfers again to the first transmission state or other transmission states. The transmission light in this transmission state is received by the light-receiving means, which detects changes of the transmission state.

As above mentioned, the present invention is composed to emit the bias light superimposed by the control pulse lights having different intensities each other from the incident-light-producing means to the light transmission means having a multistable characteristic, so the present invention can switch the plural transmission states of the optical bistable region belonging to the multistable characteristic by superimposing the plural control pulse lights to the bias light. Accordingly, the invention has an availability of being able to compose a whole light type switching apparatus only by imposing the purely optical pulses without using a particular inverter, etc.

The optical switching apparatus of the invention biases an light transmission means into optical bistable regions having two light transmission states among optical multistable characteristics of the light transmission means by a bias light emitted from an incident-light-producing means, and then switches the states by superimposing two control pulse lights having different intensities each other on the bias light.

By this reason, the optical switching apparatus is applicable to such circuits as two-valued logic circuits, using only purely optical pulse lights.

In the optical switching apparatus of the invention, also, a bias light produced by an incident-light-producing means transmits a light transmission means in either light transmission state of an optical bistable region in the light transmission means to be received by a light-receiving means. When the bias light is superimposed a control pulse light produced by the incident-light-producing means and the wavelength of which exceeds the optical bistable region, the light transmission means changes to the different transmission state, and the transmission light is received by the light-receiving means in this transmission state. Hereby, a change of the transmission state can be detected. Further, if the bias light is superimposed by a control pulse light whose wavelength reaches to e.g. next optical bistable state, the light transmission state of the light transmission means transfers to a different region when the control pulse light disappears, then the light transmission means transfers again to the first transmission state or other transmission states. The transmission light in this transmission state is received by the light-receiving means, which detects changes of the transmission state.

As above mentioned, the present invention is composed to emit the bias light superimposed by the control pulse lights having different wavelengths each other from the incident-light-producing means to the light transmission means having a multistable characteristic, so the present invention can switch the plural transmission states of the optical bistable region belonging to the multistable characteristic by superimposing the plural control pulse lights to the bias light. Accordingly, the invention has an availability of being able to compose a whole light type switching apparatus only by imposing the purely optical pulses without using a particular inverter, etc.

The optical switching apparatus in the invention biases a light transmission means into optical bistable regions having two light transmission states among optical multistable characteristics of the light transmission means by a bias light emitted from an incident-light-producing means, and then switches the states by superimposing two control pulse lights having different wavelengths each other on the bias light.

By this reason, the optical switching apparatus is applicable to such circuits as two-valued logic circuits, using purely optical pulse lights.

In the optical switching apparatus of the invention, also, lights emitted from an incident-light-producing means transmit plural optical bistable devices arranged optically in series successively, then each optical bistable device's transmission state changes and manifests each optical bistable characteristic, consequently multistable characteristics having plural optical bistable characteristic can be obtained.

The optical switching apparatus in the invention, also, effectively changes light transmission states in high speed and using little light energy by a semiconductor quantum well light absorption layer of at least an optical bistable device among plural optical bistable devices.

Because the optical switching device in the invention, also, utilizes a nonlinear etalon device as at least an optical bistable device among plural optical bistable devices, it can construct an light transmission means in simple construction without using other electric circuits.

The optical switching device in the invention, also, can construct a light transmission means in small size by integrated devices composed by laminating plural optical bistable devices arranged optically in series.

The optical switching device in the invention, also, can construct a light transmission means in small size and make it operate in high speed with low energy by using n-i-p-i-n type or p-i-n-i-p type integrated devices including two semiconductor quantum well light absorption regions.

The optical switching device in the invention, also, can construct more easily a small size light transmission means by using integrated devices laminating two nonlinear etalon devices with inputting a dielectric spacer layer between them.

The optical switching device in the invention, also, can construct easily a further small size light transmission means by using laminated integrated devices commonly using one side of mirrors of two nonlinear etalon devices.

The optical logic operation circuits in the invention, also, biases a light transmission means to an optical bistable characteristic among its optical multistable characteristics by a bias light emitted from an incident-light-producing means, and supplies operation input values to the incident-light-producing means. Then plural control pulse lights whose intensities are determined according to the operation input values are emitted in the state of being superimposed by the bias light from the incident-light-producing means to the light transmission means. Hereby, the light transmission state of the light transmission means changes, and the transmission light corresponding to the operation input values can be obtained. The light having transmitted is received by an light-receiving means, which detects transmission state of the light transmission means and outputs the results as operation output values.

As mentioned above, the invention constructs optical logic operation circuits utilizing optical switching apparatus having multistable characteristics, consequently, it can execute high speed logic operations operated by purely optical lights.

In the optical logic operation circuit of the invention, also, if a control pulse light is emitted from an incident-light-producing means in a state of being superimposed by a bias light under the condition that, for example, any logical value among plural operation input values comes to a logical value "1", the incident light does not exceed the region where the transmission state of an optical bistable region is changed. Then, the light transmission state of a light transmission means does not change, and a light-receiving means detects the original transmission state. Also, for instance, when two logical values come to "1", plural control pulse lights superimposed by a bias light are emitted from the incident-light-producing means. Hereby, because the superimposed light has an light intensity exceeding the region where the transmission state of the optical bistable region is changed, the transmission state of the optical bistable region changes, and then the light-receiving means detects the transmission state different from the previous state. As the result, such logical operations as AND and NAND can be executed.

In the optical logic operation circuit of the invention, also, if a control pulse light is emitted from an incident-light-producing means in a state of being superimposed by a bias light under the condition that, for example, any logical value among plural operation input values comes to a logical value "1", the incident light exceeds the region where the transmission states of an optical bistable region is changed. Then, the light transmission state of a light transmission means changes, and a light-receiving means detects the state different from the original transmission state. Also, for instance, when two logical values come to "1", plural control pulse lights superimposed by a bias light are emitted from the incident-light-producing means. Hereby, because the superimposed light has an light intensity exceeding the region where the transmission state of the optical bistable region is changed, the transmission state of the optical bistable region changes, and then the light-receiving means detects the transmission state different from the previous state. As the result, such logical operations as OR and NOR whose logical output values all differ from the original values except that the operation input values are both "0" can be executed.

In the optical logic operation circuit of the invention, also, if a control pulse light is emitted from an incident-light-producing means in a state of being superimposed by a bias light under the condition that, for example, any logical value among plural operation input values comes to a logical value "1", the incident light has the light intensity which exceeds the region where the transmission state of an optical bistable region is changed and does not reach to the next optical bistable region. Then, the light transmission state of a light transmission means changes, and a light-receiving means detects the state different from the original transmission state. Also, for instance, when two logical values come to "1", plural control pulse lights superimposed by a bias light are emitted from the incident-light-producing means. Hereby, because the superimposed light has the light intensity reaching to the next optical bistable region, the transmission state of the optical bistable region returns to e.g. the original transmission state, and then the light-receiving means detects the transmission state. As the result, such logical operations as the equivalent logic or the exclusive-OR whose logical output values change when either of the operation input values is the logical value "1" can be executed.

In the optical logic operation circuit of the invention, also, if a control pulse light is emitted from an incident-light-producing means in a state of being superimposed by a bias light under the condition that, for example, any logical value among plural operation input values comes to a logical value "1", the incident light has the light intensity which reaches to the next optical bistable region and does not exceed the region where the transmission state of the next optical bistable region is changed. Then, the light transmission state of a light transmission means returns to the original state, and a light-receiving means detects the same light transmission state as the original light transmission state. Also, for instance, when two logical values come to "1", plural control pulse lights superimposed by a bias light are emitted from the incident-light-producing means. Hereby, because the superimposed light has the light intensity exceeding the region where the light transmission state of the next optical bistable region is changed, the light transmission state of the optical bistable region changes to the transmission state different from the original transmission state, and then the light-receiving means detects the transmission state. As the result, such logical operations as AND and NAND can be executed.

In the optical logic operation circuit of the invention, also, if a control pulse light is emitted from an incident-light-producing means in a state of being superimposed by a bias light under the condition that, for example, any logical value among plural operation input values comes to a logical value "1", the incident light has the light intensity exceeding the region where the transmission state of the next optical bistable region is changed. Then, the light transmission state of a light transmission means changes to the transmission state different from the original state, and a light-receiving means detects the transmission state different from the original transmission state. Also, for instance, when two logical values come to "1", plural control pulse lights superimposed by a bias light are emitted from the incident-light-producing means. Hereby, because the superimposed light has the light intensity exceeding the region where the light transmission state of the next optical bistable region is changed, the light transmission state of the optical bistable region changes to the different transmission state from the original transmission state, and then the light-receiving means detects the transmission state. As the result, such logical operations as NOR and OR can be executed.

In the optical logic operation circuits in the invention, also, biases a light transmission means to an optical bistable characteristic among its optical multistable characteristics by a bias light emitted from an incident-light-producing means, and supplies operation input values to the incident-light-producing means. Then control pulse lights whose wavelengths are different each other and are determined according to the operation input values are emitted from the incident-light-producing means to the light transmission means in the state of being superimposed by the bias light. Hereby, the light transmission state of the light transmission means changes, and the transmission light corresponding to the operation input values can be obtained. The transmission light is received by an light-receiving means, which detects transmission states of the light transmission means and outputs the results as operation output values.

That is, the invention constructs optical logic operation circuits utilizing optical switching apparatus having multistable characteristics, consequently, it can execute high speed logic operations operated by purely optical pulse lights.

In the optical logic operation circuit of the invention, also, if a control pulse light whose wavelength does not exceed the region where the transmission state of an optical bistable region is changed is emitted from an incident-light-producing means in a state of being superimposed by a bias light under the condition that, for example, any logical value among plural operation input values comes to a logical value "1", the state of a light transmission means does not change, and a light-receiving means detects the original transmission state. Also, for instance, when two logical values come to "1", a control pulse light whose wavelength exceeds the region where the transmission state of the optical bistable region is changed is emitted from the incident-light-producing means in the state superimposed by a bias light. Then, the transmission state of the optical bistable region changes, and the light-receiving means for receiving the transmission light detects the transmission state different from the previous state. As the result, such logical operations as AND and NAND can be executed.

In the optical logic operation circuit of the invention, also, if a control pulse light whose wavelength exceeds the region where the transmission state of an optical bistable region is changed is emitted from an incident-light-producing means in a state of being superimposed by a bias light under the condition that, for example, any logical value among plural operation input values comes to a logical value "1", the light transmission state of a light transmission means changes, and a light-receiving means detects the transmission state different from the original transmission state. Also, for instance, when two logical values come to "1", a control pulse light whose wavelength exceeds the region where the transmission state of the optical bistable region is changed is emitted from the incident-light-producing means in the state superimposed by a bias light. Then, the transmission state of the optical bistable region changes, and the light-receiving means for receiving the transmission light detects the transmission state different from the previous state. As the result, such logical operations as OR and NOR whose logical output values all differ from the original values except that the operation input values are both "0" can be executed.

In the optical logic operation circuit of the invention, also, if a control pulse light whose wavelength exceeds the region where the transmission state of an optical bistable region is changed and does not reach to the next optical bistable region is emitted from an incident-light-producing means in a state of being superimposed by a bias light under the condition that, for example, any logical value among plural operation input values comes to a logical value "1", the light transmission state of a light transmission means changes, and a light-receiving means detects the transmission state different from the original transmission state. Also, for instance, when two logical values come to "1", a control pulse light whose wavelength reaches to the next optical bistable region is emitted from the incident-light-producing means in the state superimposed by a bias light. Then, the transmission state of the optical bistable region returns to e.g. the original transmission state, and the light-receiving means for receiving the transmission light detects the transmission state. As the result, such logical operations as the equivalent logic or the exclusive-OR whose logical output values change when either of the operation input values is the logical value "1" can be executed.

In the optical logic operation circuit of the invention, also, if a control pulse light whose wavelength reaches to the next optical bistable region and does not exceed the region where the transmission state of the next optical bistable region is changed is emitted from an incident-light-producing means in a state of being superimposed by a bias light under the condition that, for example, any logical value among plural operation input values comes to a logical value "1", the light transmission state of a light transmission means returns to the original state, and a light-receiving means detects the same transmission state as the original transmission state. Also, for instance, when two logical values come to "1", a control pulse light whose wavelength exceeds the region where the transmission state of the next optical bistable region is changed is emitted from the incident-light-producing means in the state superimposed by a bias light. Hereby, the transmission state of the optical bistable region changes to the transmission state different from the original transmission state, and the light-receiving means for receiving the transmission light detects the transmission state. As the result, such logical operations as AND and NAND can be executed.

In the optical logic operation circuit of the invention, also, if a control pulse light whose wavelength exceeds the region where the transmission state of the next optical bistable region is changed is emitted from an incident-light-producing means in a state of being superimposed by a bias light under the condition that, for example, any logical value among plural operation input values comes to a logical value "1", the light transmission state of a light transmission means transfers to the state different from the original state, and a light-receiving means detects the transmission state different from the original transmission state. Also, for instance, when two logical values come to "1", a control pulse light whose wavelength exceeds the region where the transmission state of the next optical bistable region is changed is emitted from the incident-light-producing means in the state superimposed by a bias light. Hereby, the transmission state of the optical bistable region changes to the transmission state different from the original transmission state, and the light-receiving means for receiving the transmission light detects the transmission state. As the result, such logical operations as NOR and OR can be executed.

The optical logic operation circuit in the invention, also, biases a light transmission means to a monostable region among its optical multistable characteristics by a bias light emitted from an incident-light-producing means, and supplies operation input values to the incident-light-producing means. Then plural control pulse lights having predetermined intensities according to the operation input values are emitted in the state of being superimposed by the bias light from the incident-light-producing means to the light transmission means. Hereby, the transmission state of the light transmission means changes due to exceeding an optical bistable region, and the transmission light corresponding to the operation input values can be obtained. The transmission light is received by an light-receiving means, which detects transmission states of the light transmission means and outputs the results as operation output values.

Hereby, the invention can effectively execute such logical operations as the equivalent logic or the exclusive-OR using purely optical control pulse lights.

The optical logic operation circuit in the invention, also, biases a light transmission means to a monostable region among its optical multistable characteristics by a bias light emitted from an incident-light-producing means, and supplies operation input values to the incident-light-producing means. Then control pulse lights having different wavelengths according to the operation input values are emitted in the state of being superimposed by the bias light from the incident-light-producing means to the light transmission means. Hereby, the transmission state of the light transmission means changes due to exceeding an optical bistable region, and the transmission light corresponding to the operation input values can be obtained. The transmission light is received by an light-receiving means, which detects transmission states of the light transmission means and outputs the results as operation output values.

Hereby, the invention can effectively execute such logical operations as the equivalent logic or the exclusive-OR using purely optical control pulse lights.

In the picture processor in the invention, also, a bias-light-producing means, first, emits a bias light to a two-dimensional array, then each light transmission device is biased to any optical bistable region of optical multistable characteristics. If inputted patterns come from, e.g. two pictures are emitted in predetermined light intensities to the two-dimensional array from a picture-inputting means, only the light transmission devices located on the common areas to the both inputted patterns change from the original transmission states, then the changed states are memorized in the two-dimensional array. Hereby, verifications of pictures and the like can be executed. When succeeding processes are required to be executed, each light transmission device is made to return to the original states by being irradiated by pulse lights from a reset means.

In the picture processor in the invention, also, only the common bright areas of inputted patterns of two pictures irradiated from a picture-inputting-means to a two-dimensional array change transmission states of light transmission devices.

Hereby, the picture processor in the invention can abstract these areas effectively.

In the picture processor in the invention, also, either bright area of inputted patterns of two pictures irradiated from a picture-inputting-means to a two-dimensional array and the common bright areas of them change transmission states of light transmission devices.

Hereby, the picture processor in the invention can abstract these areas effectively.

In the picture processor in the invention, also, only either bright area of inputted patterns of two pictures irradiated from a picture-inputting-means to a two-dimensional array changes transmission states of light transmission devices.

Hereby, the picture processor in the invention can abstract the area effectively.

In the picture processor in the invention, also, the areas other than the common bright areas of inputted patterns of two pictures irradiated from a picture-inputting-means to a two-dimensional array change transmission states of light transmission devices.

Hereby, the picture processor in the invention can abstract these areas effectively.

In the picture processor in the invention, also, only the common bright areas of inputted patterns of two pictures irradiated from a picture-inputting-means to a two-dimensional array change transmission states of light transmission devices.

Hereby, the picture processor in the invention can abstract these areas effectively.

In the picture processor in the invention, also, a bias-light-producing means emits, first, a bias light to a two-dimensional array, then each light transmission device is biased to any optical monostable region of optical multistable characteristics. If inputted patterns come from, e.g. two pictures are emitted in predetermined light intensities to the two-dimensional array from a picture-inputting means, only the light transmission devices located on the common areas to the both inputted patterns exceed an optical bistable region and change from the original transmission states, hereby the states are memorized in the two-dimensional array, and verifications of pictures and the like can be executed.

In the picture processor in the invention, also, a bias-light-producing means, first, emits a bias light to a two-dimensional array, then each light transmission device is biased to any optical bistable region of optical multistable characteristics. If inputted patterns come from, e.g. two pictures are emitted in different wave lengths to the two-dimensional array from a picture-inputting means, only the light transmission devices located on the common areas to the both inputted patterns change from the original transmission states, then the changed states are memorized in the two-dimensional array. Hereby, verifications of pictures and the like can be executed. When succeeding processes are required to be executed, each light transmission device is made to return to the original states by being irradiated by pulse lights from a reset means.

In the picture processor in the invention, also, only the common bright areas of inputted patterns of two pictures irradiated from a picture-inputting-means to a two-dimensional array change transmission states of light transmission devices.

Hereby, the picture processor in the invention can abstract these areas effectively.

In the picture processor in the invention, also, either bright area of inputted patterns of two pictures irradiated from a picture-inputting-means to a two-dimensional array and the common bright areas of them change transmission states of light transmission devices.

Hereby, the picture processor in the invention can abstract these areas effectively.

In the picture processor in the invention, also, the areas other than the common bright areas of inputted patterns of two pictures irradiated from a picture-inputting-means to a two-dimensional array change transmission states of light transmission devices.

Hereby, the picture processor in the invention can abstract these areas effectively.

In the picture processor in the invention, also, only the common bright areas of inputted patterns of two pictures irradiated from a picture-inputting-means to a two-dimensional array change transmission states of light transmission devices.

Hereby, the picture processor in the invention can abstract these areas effectively.

In the picture processor in the invention, also, a bias-light-producing means, first, emits a bias light to a two-dimensional array, then each light transmission device is biased to any optical monostable region of optical multistable characteristics. If inputted patterns come from, e.g. two pictures are emitted in different wavelengths to the two-dimensional array from a picture-inputting means, only the light transmission devices located on the common areas to the both inputted patterns exceed an optical bistable region and change from the original transmission states, hereby the states are memorized in the two-dimensional array, and verifications of pictures and the like can be executed.

In the picture processor in the invention, also, a bias-light-producing means emits a bias light to a two-dimensional array, then each light transmission device is biased to any optical bistable region of optical multistable characteristics. If an inputted pattern of a certain picture is emitted in a predetermined intensity to the two-dimensional array from a picture-inputting means, only the light transmission devices located on e.g. the changed areas in brightness of the inputted pattern exceed the optical bistable region and change from the original transmission states, then the changed states are memorized in the two-dimensional array. Hereby, the processing of the edge verifications of pictures and the like can be executed. When succeeding processes are required to be executed, each light transmission device is made to return to the original states by being irradiated by pulse lights from a reset means.

BRIEF DESCRIPTION OF THE DRAWINGS

FIG. 18(a) and FIG. 18(b) are drawings is a drawing showing the results of the operations of the embodiment shown in FIG. 17.

FIG. 20(a) and FIG. 20(b) are drawings showing the results of the operations of the embodiment shown in FIG. 19.

FIG. 27(a), FIG. 27(b) and FIG. 27(c) are drawings for describing an operation of the embodiment of the picture processor shown in FIG. 26

FIG. 30 is a drawing showing another example of a picture-processing by the embodiment shown in FIG. 26.

DETAILED DESCRIPTION OF THE PREFERRED EMBODIMENTS

Some preferred embodiments of the present invention will now be described with reference to the accompanying drawings.

EMBODIMENT 1.

Figure 1:
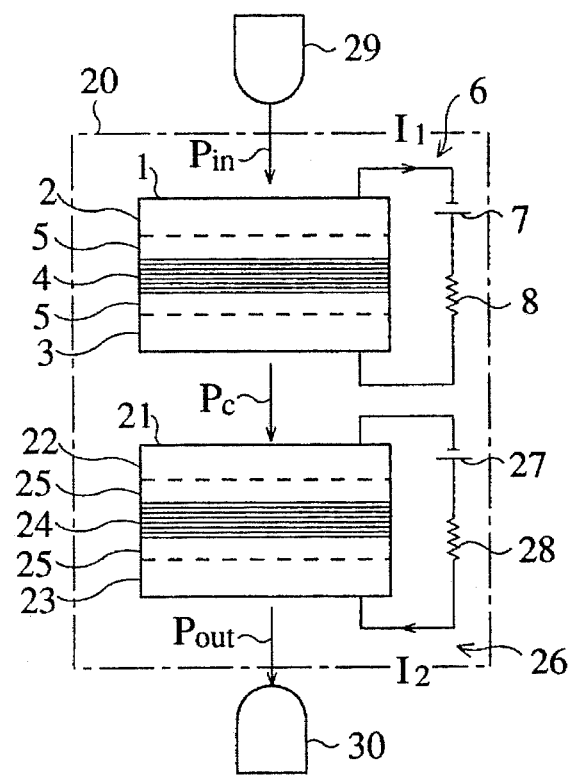
FIG. 1 is a drawing showing a construction of an embodiment of an optical switching device of the present invention.
Figure 31:
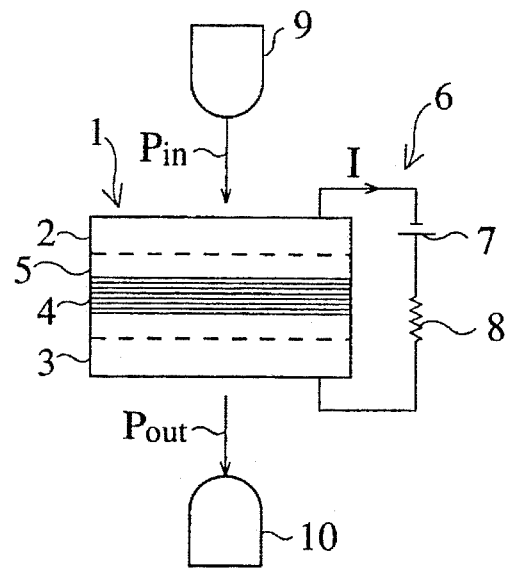
FIG. 31 is a drawing showing a composition of a conventional optical switching apparatus.
Figure 32:
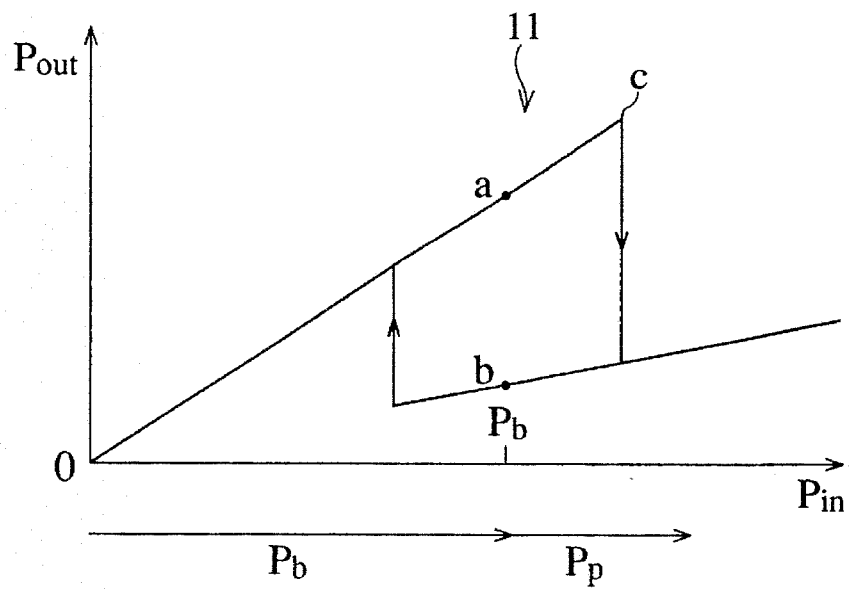
FIG. 32 is a drawing showing a optical bistable characteristic of the conventional optical switching apparatus.

FIG. 1 is a drawing showing a composition of an embodiment of a optical switching apparatus of the present invention. Those parts in FIG. 1 which are functionally identical to those already described in connection with the prior art example shown in FIG. 31 are denoted by the same reference numerals, and any repetitive description thereof is omitted.

In FIG. 1, reference numeral 20 denotes a light transmission circuit (light transmission means) having a multistable characteristic including plural optical bistable regions showing two light transmission states to a light having a predetermined wavelength. The light transmission circuit 20 of the embodiment is composed by arranging the first optical bistable device 1 and the second optical bistable device 21 in optical series. In these devices 1 and 21, numerals 2 and 22 denote p type semiconductor layers formed by p type aluminum gallium arsenide (to be denoted later as AlGaAs); numerals 3 and 23 denote n type semiconductor layers formed by n type AlGaAs; numerals 4 and 24 denote multiple quantum well layers formed by laminating gallium arsenide (GaAs) and AlGaAs one after the other; and numerals 5 and 25 denote intrinsic semiconductor layers formed by intrinsic AlGaAs. An external electric power source circuit 26 including a direct current power source 27 and an electric resistor 28 is connected to the second optical bistable device 21 like the first optical bistable device 1. Also, numeral 29 is a light source (incident-light-producing means) producing lights having a predetermined wavelength by which light transmission circuit 20 takes multistable characteristics, and supplying an incident light Pin, a bias light of the light Pin having a predetermined intensity, to the p type semiconductor layer 2 of the first optical bistable device 1, and further outputting a bias light superimposed by two pulse lights having different intensities. Numeral 30 denotes a light-receiving device (light-receiving means) receiving the light Pout, the light Pc having been transmitted through the first optical bistable device 1 and further through the second optical bistable device 21, and detecting the two transmission states of the light transmission circuit 20.

Figure 2:
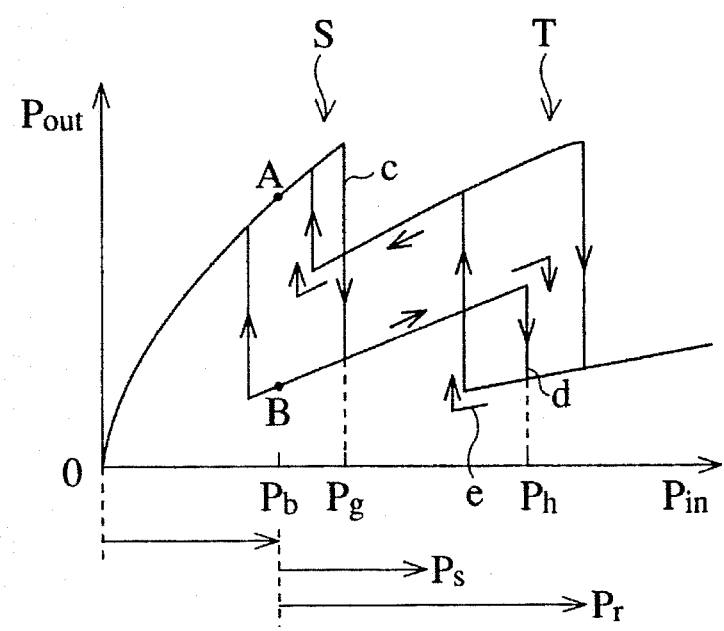
FIG. 2 is a drawing showing an example of a multistable characteristic of the embodiment shown in FIG. 1.
Figure 3:
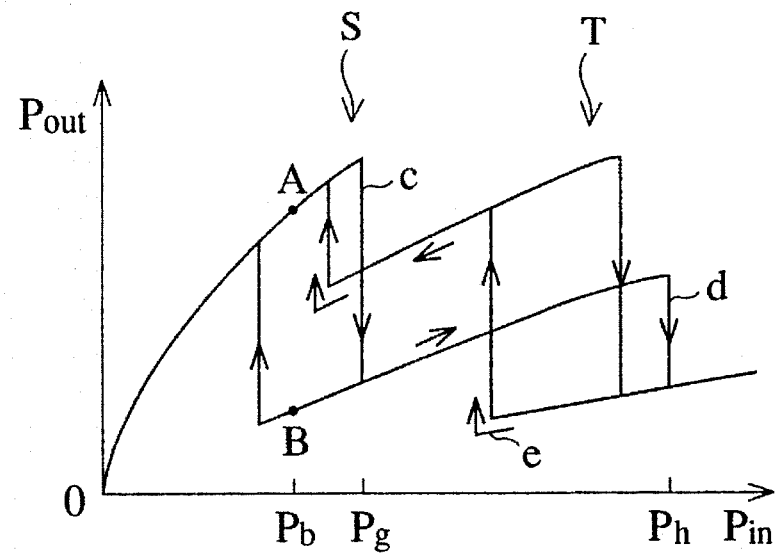
FIG. 3 is a drawing showing another example of a multistable characteristic of the embodiment shown in FIG. 1.
Figure 4:
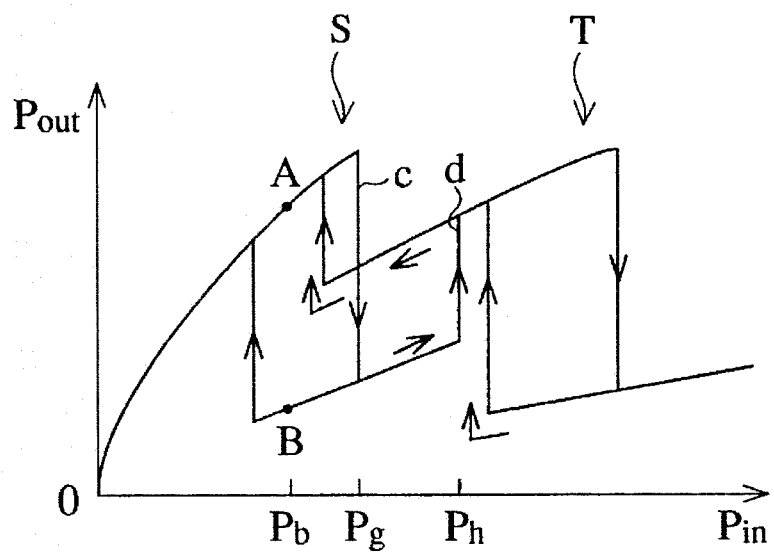
FIG. 4 is a drawing showing another example of a multistable characteristic of the embodiment shown in FIG. 1.
Figure 5:
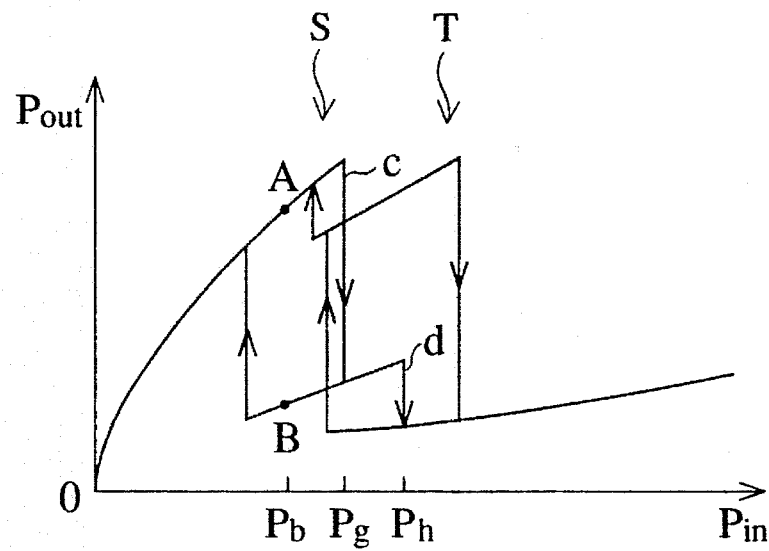
FIG. 5 is a drawing showing another example of a multistable characteristic of the embodiment shown in FIG. 1.
Figure 6:
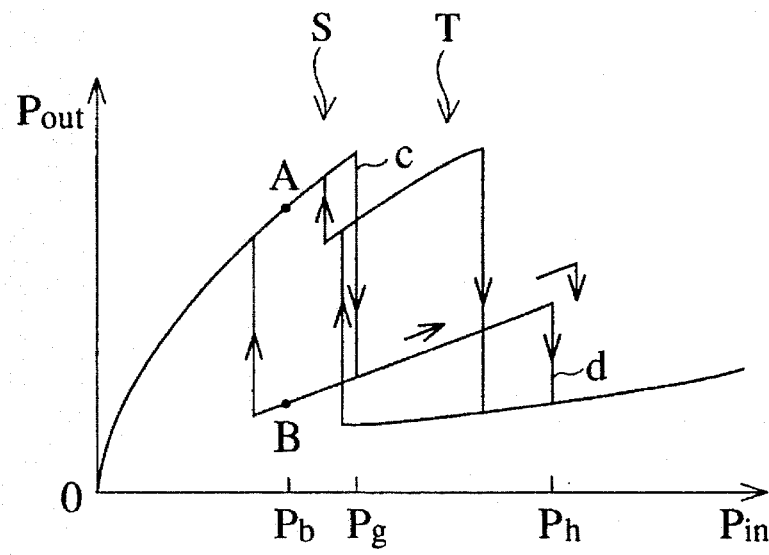
FIG. 6 is a drawing showing another example of a multistable characteristic of the embodiment shown in FIG. 1.

FIG. 2 is a drawing showing a characteristic of the transmission light Pout versus the incident light Pin. FIG. 2 shows an example of optical multistable characteristics having plural optical bistable regions S and T attained by the transmission light Pout having been transmitted through two optical bistable devices 1 and 21.

Next, the operation of the embodiment 1 will be described. At first, when the bias light Pin having the light intensity Pb corresponding to the first optical bistable region S in the multistable characteristics of the light transmission circuit 20 is irradiated from the light source 29, the incident light Pin is transmitted through the first device 1 and the second device 21 according to each high transmitting state characteristic to be received by the light-receiving device 30 as the transmitted light Pout in the high transmitting state A. And the light-receiving device 30 is turned to the ON state.

Next, when the incident light Pin, made by superimposing the first controlling pulse light Ps on the bias light Pb, having the light intensity Ph exceeding the light intensity Pg at the "C" point in the first optical bistable region S in the multistable characteristic of the light transmission circuit 20 and being smaller than the light intensity at the turning point "d" in the optical bistable region T is emitted from the light source 29, the incident light Pin is transmitted through the first device 1 being still high transmitting state according to its characteristic, and the transmitted light Pc, having increased by the increased amount of the incident light Pin, travels into the second device 21. On the other hand, in the second device 21, the positive feedback is generated at the point "C" due to the increase of the incident light intensity in the same way as described about the conventional optical switching apparatus, and the amount of the light absorption rapidly increases, and further the light intensity of the transmitted light Pout rapidly decreases. Namely, the second device 21 turns to the low transmitting state. The low transmitting state of the second device 21 is kept and moves to the "B" point, even if the light intensity of the incident light Pin returns to the intensity Pb in this state, and further the light receiving device 30 turns to the OFF state by receiving the transmitted light Pout.

Next, when the incident light Pin, made by superimposing the second controlling pulse light Pr on the bias light Pb, having the light intensity (Pb+Pr) exceeding the light intensity Pb at the turning point "c" in the second optical bistable region T in the multistable characteristics of the light transmission circuit 20 is emitted from the light source 29, the incident light Pin is absorbed in the first device 1, and further the transmitted light Pc is absorbed in the second device 21 to be received by the light-receiving device 30. In this case, the incident light Pin is transmitted through the first device 1 and the second device 21 in accordance with the lower side characteristic of the characteristic chart from the transmission state B. Now, since the first device 1 is in the high transmitting state although the second device 21 is in the low transmitting state, the positive feedback as noted about the conventional optical switching apparatus occurs where the incident light Pin exceeds the light intensity Ph ("d" point) in the first device 1, then the light absorption amount rapidly increases and the light intensity of the transmitted light Pc of the first device 1 rapidly decreases. That is to say, the first device 1 also turns to the low transmitting state. When the light intensity of the incident light Pin from the light source 29 is returned to the light intensity Pb in this state, the second device 21 transfers from the low transmitting state to the high transmitting state at the "e" point, since the incident light intensity Pc travelled into the second device 21 decreases to the degree where the same processes as the changes from the OFF state to the ON state of the conventional optical switching apparatus occur in the second device 21 because the incident light intensity decreases with the first device 1 being still in the low transmitting state, unlike the aforementioned case of superimposing the first controlling pulse light Ps. Further, since the light intensity of the bias light Pb is set at the light intensity smaller than the optical bistable region of the first device 1, the first device 1 also transfers from the low transmitting state to the high transmitting state and moves to the "A" point, and further the light-receiving device 30 receives the transmitted light Pout to turn to the ON state.

As above mentioned, in the embodiment, the light transmission circuit 20 is biased in the bistable region S by the bias light Pb, first. Then, the light transmission circuit 20 can be switched to the low transmission state B from the high transmission state A by superimposing the first control pulse Ps on the bias light, and it can be switched to the high transmission state A from the low transmission state B by superimposing the second control pulse Pr on the bias light. That is, two biased light transmission states A and B can be switched optically by using the two control pulse lights; the light intensity Ps of the first control pulse light exceeds the first optical bistable region S and does not reach to the turning point d in the second optical bistable region T, the light intensity Pr of the second control pulse light exceeds the turning point d of the second optical bistable region T.

By the way, the above mentioned embodiment uses the multistable characteristic shown in FIG. 2, but the light transmission circuit 20 composed of the two optical bistable device 1, 21 arranged in optical series can attain such multistable characteristics as shown in FIG. 3~FIG. 6, too, by adjusting e.g. the thicknesses of the multiple quantum well layers 4, 24 or the inverse bias voltage V from the electric power sources 7, 27. In these cases, the light transmission circuit 20 can be switched by two control pulses in the same way described above. Further, the second turning point d locates on the point exceeding the second bistable region T in FIG. 3; the second turning point d locates on the point a little bit smaller than the second bistable region T in FIG. 4; the first bistable region S and the second bistable region T are overlapped in a part in FIG. 5; and the first and the second bistable region S, T are overlapped in a part and the turning point d exceeds the second bistable region T in FIG. 6. In any case, switching in the same way described above can be executed by setting the intensity of the first control pulse Ps between the light intensity Pg corresponding to the first turning point c and the light intensity Ph corresponding to the second turning point d, and setting the intensity of the second control pulse Pr larger than the light intensity Ph corresponding to the second turning point d. Also, the optical bistable devices are arranged in optical series as an example in the above mentioned embodiment, but switching by control pulses more than three utilizing the multistable characteristic attained by overlapping the optical bistable devices more than three steps can also be executed in the present invention. Further, the example of switching the light transmission states by the different intensities of the control pulses having a common predetermined wavelength is described, but the switching in the same way mentioned above using the control pulse lights having different wavelengths can also be executed, because the multistability can be attained by different wavelengths like different intensities as described in e.g. "Applied Physics Letters", vol. 59, p. 1016 (1991).

EMBODIMENT 2.

Figure 7:
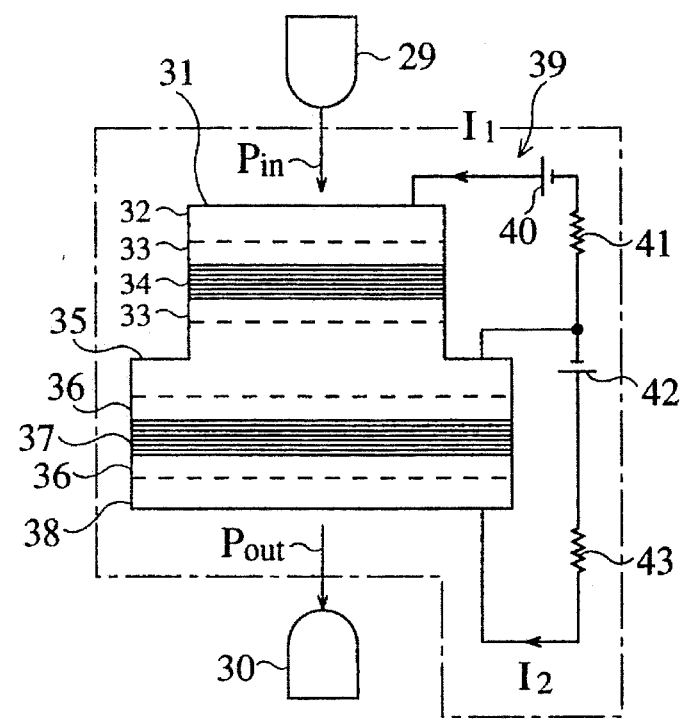
FIG. 7 is a drawing showing the construction of another embodiment of the optical switching device of the present invention.

FIG. 7 is a drawing showing a composition of another embodiment of a optical switching apparatus of the invention. Those parts in FIG. 7 which are functionally identical to those already described in connection with the embodiment 1 shown in FIG. 1 are denoted by the same reference numerals, and any repetitive description thereof is omitted.

In FIG. 7, reference numeral 31 denotes a n-i-p-i-n type light transmission device. Numeral 32 denotes the first n type semiconductor layer; numeral 33 denotes an intrinsic semiconductor layer; numeral 34 denotes the first semiconductor quantum well layer; numeral 35 denotes a p type semiconductor layer; numeral 36 denotes the second intrinsic semiconductor layer; numeral 37 denotes the second semiconductor quantum well layer; and numeral 38 denotes the second n type semiconductor layer. This light transmission device 31 is an integrated device laminating and integrating the first optical bistable device composed of the semiconductor layers 32~35 and the second semiconductor layers 35~38 in optical series using the p type semiconductor layer 35 in common. Numeral 39 denotes an external electric power source circuit including direct current power sources 40 and 42. The direct current power source 40's positive terminal is connected to the n type semiconductor layer 32 and negative terminal is connected to the p type semiconductor layer 35 through a resistor 41. Further, the direct current source 42's negative terminal is connected to the p type semiconductor layer 35 in common, and the positive terminal is connected to the n type semiconductor layer 38 through a resistor 43. This embodiment, also, attains a multistable characteristic like the above mentioned embodiment shown in FIGS. 2–6.

Next, the operation of the embodiment 2 will be described. Let it be supposed that the multistable characteristics shown in FIG. 2 has been obtained by adjusting the thickness of the semiconductor quantum well layers 34 and 37, the inverse bias voltages of the electric power supplies 40 and 42, and the resistance values of the resistors 41 and 43. Then, similarly to the embodiment 1, when the bias light Pin having the light intensity Pb corresponding to the first optical bistable region S in the multistable characteristics of the light transmission circuit 31 from the light source 29 at first, the incident light Pin is transmitted through the semiconductor quantum well layers 34 and 37 according to each characteristic in the high transmitting state to be received by the light-receiving device 30 as the transmitted through light Pout in the high transmitting state A. And the light-receiving device 30 turns to the ON state.

Next, when the incident light Pin, made by superimposing the first controlling pulse light Ps on the bias light Pb, having the light intensity Ph exceeding the light intensity Pg at the "C" point in the first optical bistable region S in the multistable characteristics of the light transmission circuit 31 and being smaller than the light intensity at the turning point "d" in the second optical bistable region T is emitted from the light source 29, the incident light Pin is transmitted through the semiconductor quantum well layer 34 being still in high transmitting state according to its characteristics, and the transmitted light Pc, having increased by the increased amount of the incident light Pin, travels into the semiconductor quantum well layer 37. On the other hand, in the semiconductor quantum well layer 37, the positive feedback is generated at the "C" point due to the increasing of the incident light intensity in the same way as described about the conventional optical switching apparatus, and the amount of the light absorption rapidly increases, and further the light intensity of the transmitted light Pout rapidly decreases. Namely, the semiconductor quantum well layer 37 turns to the low transmitting state. The low transmitting state of the semiconductor quantum well layer 37 is kept and moves to the "B" point even if the light intensity of the incident light Pin returns to the intensity Pb in this state, and the light-receiving device 30 turns to the OFF state by receiving the transmitted light Pout.

Next, when the incident light Pin, made by superimposing the second controlling pulse light Pr on the bias light Pb, having the light intensity (Pb+Pr) exceeding the light intensity Ph at the turning point "C" in the second optical bistable region T in the multistable characteristics of the light transmission circuit 31 is emitted from the light source 29, the incident light Pin is absorbed in the semiconductor quantum well layer 34, and further the transmitted light Pc is absorbed in the semiconductor quantum well layer 37 to be received by the light-receiving device 30 as the transmitted light Pout. In this case, the incident light Pin is transmitted through the semiconductor quantum well layers 34 and 37 in accordance with the lower side characteristic of the characteristic chart from the transmission state B. Now, since the semiconductor quantum well layer 34 is in the high transmitting state although the semiconductor quantum well layer 37 is in the low transmitting state, the positive feedback as noted about the conventional optical switching apparatus occurs where the incident light Pin exceeds the light intensity Ph ("d" point) in the semiconductor quantum well layer 34, then the light absorption amount rapidly increases and the light intensity of the transmitted light Pc of the semiconductor quantum well layer 34 rapidly decreases. That is to say, the semiconductor quantum well layer 34 also turns to the low transmitting state. When the light intensity of the incident light Pin from the light source 29 is returned to the light intensity Pb in this state, the semiconductor quantum well layer 37 transfers from the low transmitting state to the high transmitting state at the location of "e", since the incident light intensity Pc travelled into the quantum well layer 37 decreases in the degree where processes identical to the changes from the OFF state to the ON sate of the conventional optical switching apparatus occur because the incident light intensity decreases with the semiconductor quantum well layer 34 remaining in the low transmitting state, unlike the aforementioned case of superimposing the first controlling pulse light Ps. Further, since the light intensity of the bias light Pb is set at the light intensity smaller than the light bistable region of the semiconductor quantum well layer 34, the semiconductor quantum well layer 34 also transfers from the low transmitting state to the high transmitting state and moves to the "A" point, and further the light receiving device 30 receives the transmitted light Pout to turn to the ON state.

As above mentioned, the integrated device 31 having two multiple quantum well layers 34 and 37 can be switched reversibly between the high transmission state A and the low transmission state B in the optical bistable region S, one of the multistable characteristics of the device 31, in the embodiment. Besides, the light transmission circuit is composed of two devices formed in a body in the embodiment, then it is unnecessary to adjust the spatial locations between those devices. Therefore, the optical switching apparatus being small in size and accurate in characteristics attained can be constructed.

Figure 8:
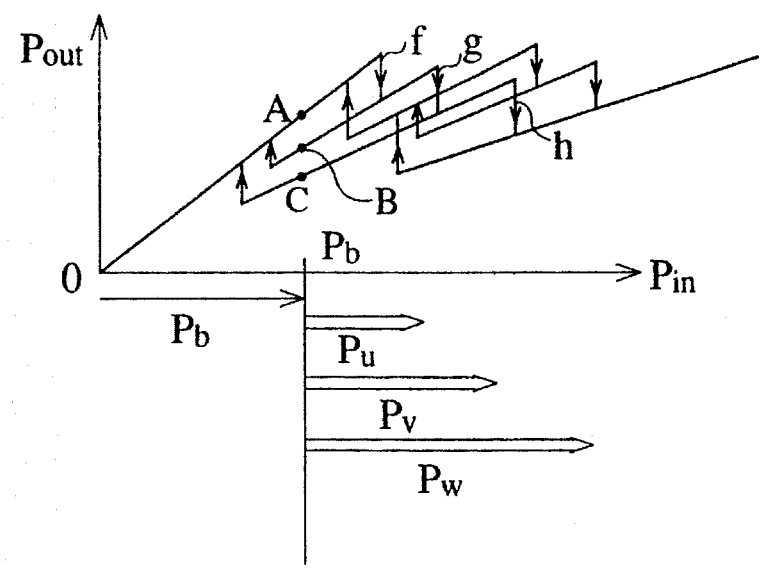
FIG. 8 is a drawing showing another example of a multistable characteristic of a optical switching apparatus of the present invention.

By the way, the n-i-p-i-n type integrated device is applied to the embodiment, however, a p-i-n-i-p type integrated device having two multiple quantum well layers can be applied to the present invention in the same way. Also, those embodiments mentioned above switch two light transmission states by using two optical bistable devices, however, it is also possible to switch more than three transmission states by utilizing the multistable characteristic obtained from a p-i-n type device shown in e.g. "Applied Physics Letters", vol. 56, p. 166 (1990). In this case, the characteristic e.g. shown in FIG. 8 can be attained by combining the multistable characteristics. In the case of FIG. 8, switching from the transmission state A to the transmission state B can be executed by superimposing the light intensity Pu exceeding the point f on the bias light Pb corresponding to the transmission states A, B and C; switching from A to B or from B to C can be executed by superimposing the light intensity Pv exceeding the point g; and switching from B to A or from C to A can be executed by superimposing the light intensity Pw exceeding the point h. Besides, the same switching can be executed by piling up more than two bistable devices similarly.

EMBODIMENT 3.

Figure 9:
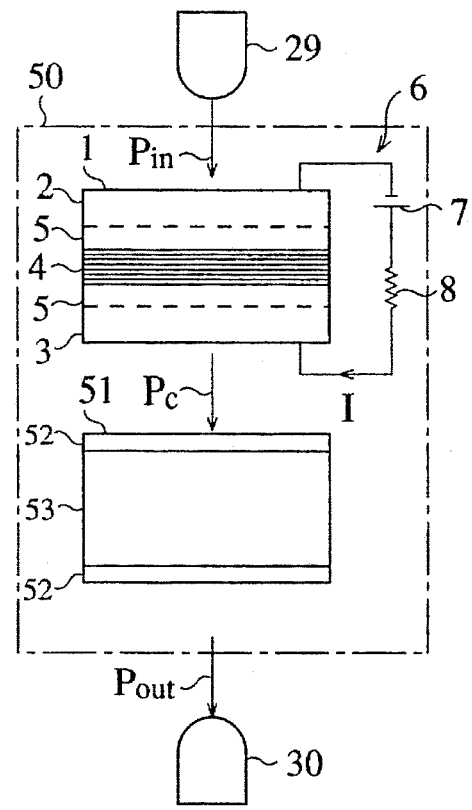
FIG. 9 is a drawing showing a construction of another embodiment of an optical switching device of the present invention.

FIG. 9 is a drawing showing a composition of another embodiment of a optical switching apparatus of the invention. Those parts in FIG. 9 which are functionally identical to those already described in connection with the embodiment 1 and 2 and the conventional apparatus shown in FIG. 1, 7 and 31 respectively are denoted by the same reference numerals, and any repetitive description thereof is omitted.

Figure 10:
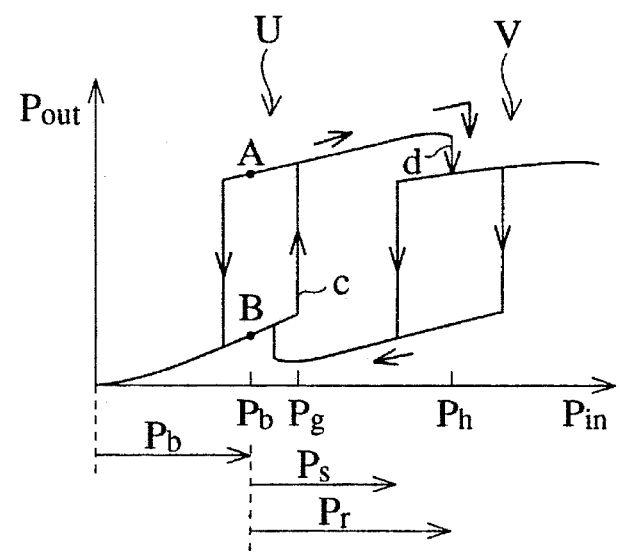
FIG. 10 is a drawing showing an example of a multistable characteristic of the embodiment shown in FIG. 9.

In FIG. 9, reference numeral 50 denotes a light transmission circuit, being composed by arranging the first optical bistable device 1 and second optical bistable device 51 in optical series. In the second optical bistable device 51, numeral 52 denotes mirrors arranged in parallel each other and composing an optical resonator. Numeral 53 denotes a nonlinear medium made of molecular gas such as sodium gas and ammonia gas, semiconductor doped glass such as cadmium sulfide selenium glass, or polymeric materials. That is, the second optical bistable device is a so called nonlinear etalon device utilizing nonlinear refraction of nonlinear media. FIG. 10 is a drawing showing a characteristic of the transmission light Pout versus the incident light Pin from the light source 29, i.e. a multistable characteristic of the light transmission circuit 50. In FIG. 10, U denotes the first optical bistable region, and V denotes the second optical bistable region.

How the optical switching apparatus shown in FIG. 9 works will now be described. First, the bias light Pin having a light intensity Pb corresponding to the first optical bistable region U in the multistable characteristic of the light transmission circuit 50 is irradiated from the light source 29. The incident light Pin is transmitted through the first optical bistable device 1, and becomes the transmission light Pc. And it travels into the second optical bistable device 51 in turn. Then it is absorbed mostly in the device 51, and is received by the light-receiving device 30 in the transmission state B. That is, the incident light Pc to the second optical bistable device 51 is refracted by the nonlinear medium 53, and is dispersed by being reflected repeatedly in the optical resonator, then is emitted as a transmission light. Hereby the transmission light Pout takes the low transmission state B, and the light-receiving device 30 which has received the transmission light Pout turns off.

Next, the first control pulse light Ps is superimposed by the bias light Pb in the light source 29. That is, the incident light Pin having the light intensity exceeding the light intensity (Pg) at the turning point c in the first optical bistable region U in the multistable characteristic of the light transmission circuit 50 and not reaching to the light intensity (Ph) at the turning point d in the second optical bistable region V is irradiated from the light source 29. The incident light Pin is transmitted through the first optical bistable device 1, and then through the second optical bistable device 51. Then it is received by the light-receiving device 30. Hereby, the light-receiving device 30 turns on. That is, the refracted light in the nonlinear medium 53 having the light intensity exceeding the light intensity Pg comes to be uniform in phase by reflections in the optical resonator, hereby almost all of the incident light Pc is transmitted to one side, the light-receiving device 30 side in this case. Besides, the light transmission circuit 50 remains in the high transmission state A by the hysteresis phenomenon of the nonlinear etalon device 51 even when the incident light Pc includes only the bias light Pb by disappearing of the pulse light. Hereby, the light-receiving device 30 receives the transmission light Pout in the high transmission state A in the optical bistable region U, and the device 30 turns on.

Next, the bias light Pb is superimposed by the second control pulse light Pr in the light source 29. That is, the incident light Pin having the light intensity (Pb+Pr) exceeding the light intensity (Ph) at the turning point in the second optical bistable region V in the multistable characteristic of the light transmission circuit 50 is emitted. Then, the incident light Pin is almost absorbed in the first optical bistable device 1, and travels into the second optical bistable device 51. Namely, like each embodiment above described, carriers are produced in the first multiple quantum well layer 4 of the first optical bistable device 1, and the photoelectric current I flows. The photoelectric current I flows in the external circuit 6, hereby, the voltage drop IR is generated across the electric resistor 8. Then the voltage V imposed across the optical bistable device 1 comes to decrease from V to (V−IR). The change of the voltage makes the electric field imposed across the intrinsic semiconductor layer 5 decrease, and as the result of the feedback, the amount of light absorbed in the multiple quantum well layer 4 rapidly increases. Then, the light intensity of the transmission light Pc rapidly decreases. Consequently, the second optical bistable device 51 returns to the low transmission state when the superimposed pulse light Pr disappears and transmission light returns to be only bias light Pb. Then the light transmission circuit 50 comes to the low transmission state B of the optical bistable region U. Accordingly, the transmission light Pout is received by the light-receiving device 30 in the weakened state. Then the light-receiving device 30 turns off.

As above described, in this embodiment, the light transmission circuit 50 is made to be biased by the bias light to the optical bistable region U, then it can be switched from the low transmission state B to the high transmission state A by superimposing the first control pulse Ps on the bias light, and further it can be switched from the high transmission state A to the low transmission state B by superimposing the second control pulse Pr on the bias light. Besides, the optical switching apparatus having optical multiple characteristic can be easily composed by applying the nonlinear etalon device to the light transmission circuit 50 without electric circuits such as an electric power supply.

Figure 11:
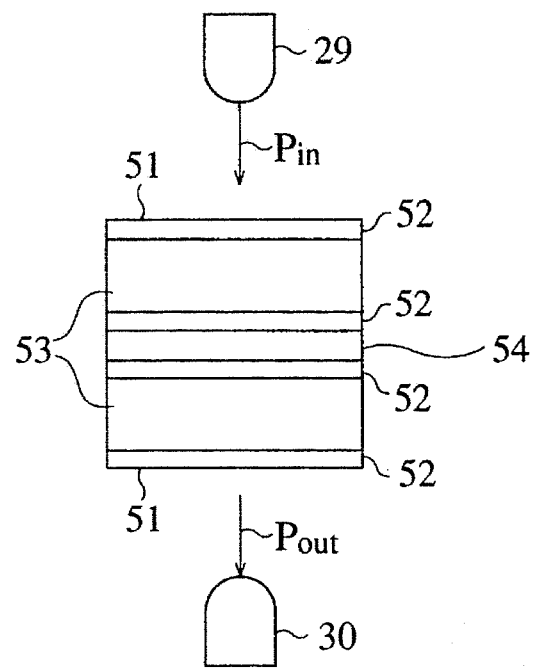
FIG. 11 is a drawing showing a construction of another embodiment of an optical switching device of the present invention.
Figure 12:
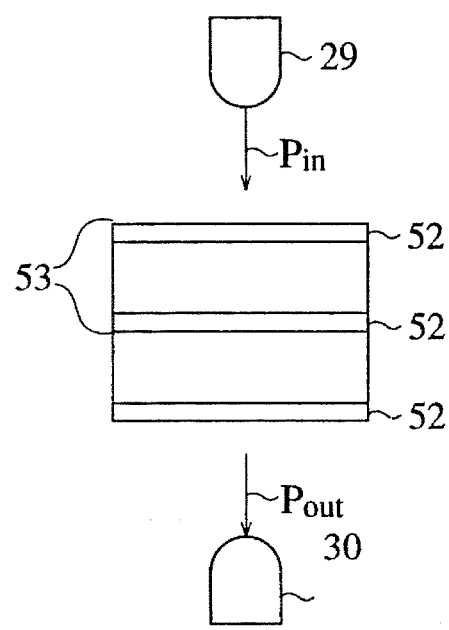
FIG. 12 is a drawing showing a construction of another embodiment of an optical switching device of the present invention.

By the way, in the embodiment, the light transmission circuit 50 is constructed by combining the optical bistable device 1 made of semiconductor circuit and the nonlinear etalon device 51, the light transmission circuit of the invention can be constructed by using only the devices laminating nonlinear etalon devices, as shown in FIG. 11 and FIG. 12. FIG. 11 shows a light transmission circuit constructed by putting a dielectric spacer 54 between the nonlinear etalon devices 51. FIG. 12 shows a light transmission circuit constructed by arranging three mirrors 52 in parallel, and inputting nonlinear media 53 between mirrors by using the center mirror in common.

EMBODIMENT 4.

Figures 13, 14:
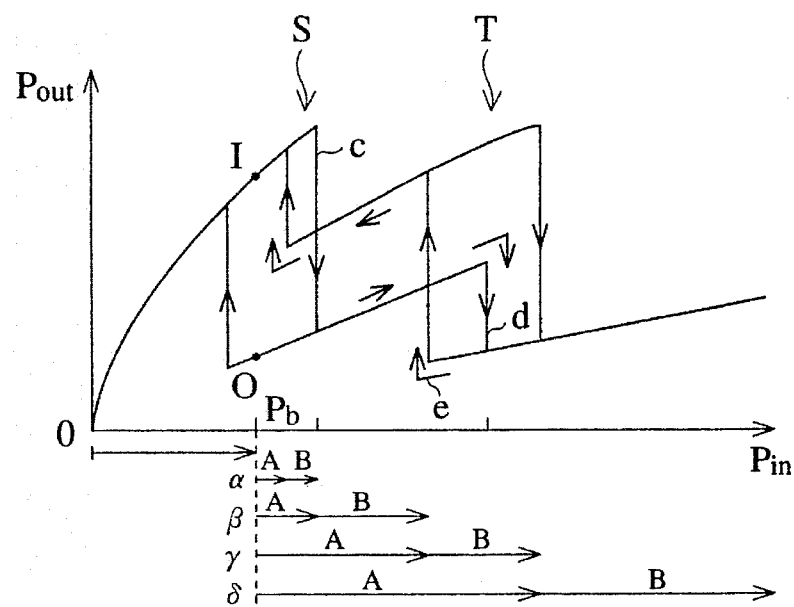
FIG. 13 is a drawing showing a principle of an embodiment of an optical logic operation circuit of the present invention.
FIG. 14 is a drawing showing the results of the operations of the embodiment shown in FIG. 13.

FIG. 13 is a drawing showing an example of a principle of an embodiment of an optical logic operation circuit of the present invention. An optical logic operation circuit applying the optical switching devices shown in FIG. 1 or FIG. 7 will be described in the embodiment. For example, the light source 29 in FIG. 1 is equipped with two logical operation inputs, and it is made to produce a bias light superimposed two control pulse lights having the predetermined light intensities corresponding to the values of the inputs. Four kinds of the light intensities of the two control pulses according to the kinds of operations are conceivable as shown in FIG. 13. In FIG. 13, α denotes a control pulse applicable to NAND operations, elements of which do not exceed individually the turning point c of the optical bistable region S and exceed it by superimposing each other. β denotes a control pulse applicable to NOR operations, elements of which exceed the turning point c of the optical bistable region S individually and do not reach to the next bistable region T by superimposing each other. γ denotes a control pulse applicable to the equivalent logic operations or AND operations, elements of which do not reach to the next optical bistable region T and exceed the turning point d of the next optical bistable region T. δ denotes a control pulse applicable to OR operations, elements of which exceed the turning point d of the next optical bistable region T individually and reach to the next linear region by superimposing each other. FIG. 14 is a drawing showing the results of operations to each input.

How the optical logic operation circuit works will now be described. The case of setting the first control pulse α to the light source 29 will be described first. The light source 29 biases the optical logic circuit in the optical bistable region S by the bias light Pb. The high transmission state on this time is represented by the logical value "1", the low transmission state on this time is represented by the logical value "0". It is supposed that the initial state has the logical value "1". In this state, when the logical operation inputs A and B are both "0", the light source 29 does not superimpose any control pulse, and irradiates only the bias light Pb to the light transmission circuit 20. Then the light transmission circuit 20 does not change its transmission state, and the light-receiving device 30 receives the transmission light in the high transmission state. Hereby, the light-receiving device 30 turns on, and the logical output comes to "1". Next, if the logical operation input value A is "0", and logical operation input value B is "1", the light source 29 irradiated the bias light Pb superimposed by the control pulse A corresponding to the operation input value B. The light-receiving circuit 30 detects the transmission light Pout having the light intensity increased a little from the light transmission circuit 20. Consequently, the light-receiving device 30 turns on, and outputs the logical value "1". Successively, if the operation input value A is "1", and operation input value B is "0", the light source 29 superimposes the control pulse B corresponding to the operation input value A on the bias light Pb, and irradiates it. Then the light-receiving device 30 detects the high transmission state of the light transmission circuit 20 in the same way above described. Hereby, the light-receiving device 30 turns on, and outputs the logical output value "1". Next, if the logical operation input values A and B are both "1", the light source 29 irradiates the bias light Pb superimposed by the control pulse A corresponding to the operation input value A and the control pulse B corresponding to the operation input value B. Hereby, the light transmission circuit 20 exceeds the turning point c of the optical bistable region S, and its transmission state changes to the low transmission state. When the control pulses A and B disappear and only the bias light Pb is irradiated, the light-receiving circuit 30 detects the transmission light, and the circuit 30 turns off. Hereby, the logical value "0" is outputted as the operation result from the light-receiving device 30.

Thus, if the light intensities of each control pulse A and B do not exceed the turning point c individually and exceed the turning point c in case of superimposing each other, NAND logic operation circuits whose logical results come to "0" when both logical inputs are "1" are obtained.

Next, in the case of setting the second control pulse β to the light source 29, first the light source 29 biases the optical logic circuit in the optical bistable region S by the bias light Pb in the same way as described above. The initial state is supposed to have the logical value "1" at this time. In this state, when the logical operation inputs A and B are both "0", the light source 29 does not superimpose any control pulse, and irradiates only the bias light Pb to the light transmission circuit 20. Then the light transmission circuit 20 does not change its transmission state, i.e. it is in the high transmission state. And the light-receiving device 30 receives the transmission light in the high transmission state. Hereby, the light-receiving device 30 turns on, and the logical output comes to "1". Next, if the logical operation input value A is "0", and logical operation input value B is "1", the light source 29 irradiates the bias light Pb superimposed by the control pulse A corresponding to the operation input value B. Because the superimposed light exceeds the turning point c in the optical bistable region S, the light transmission circuit 20 changes to the low transmission state. Consequently, if the control pulse A disappears and the transmission light returns to the bias light Pb, the light-receiving circuit 30 detects the transmission light Pout in the low transmission state, and the circuit 30 turns off. Hereby, the logical value "0" is outputted as the operation output. Successively, if the operation input value A is "1", and operation input value B is "0", the light source 29 superimposes the control pulse B corresponding to the operation input value A on the bias light Pb, and irradiates it. Then the light-receiving device 30 detects the low transmission state of the light transmission circuit 20 in the same way above described. Hereby, the light-receiving device 30 turns off, and outputs the logical output value "0". Next, if the logical operation input values A and B are both "1", the light source 29 irradiates the bias light Pb superimposed by the control pulse A corresponding to the operation input value A and the control pulse B corresponding to the operation input value B. In this case, also, because the superimposed light only exceeds the turning point c of the optical bistable region S, the light transmission circuit 20 comes to the low transmission state. When the control pulses A and B disappear and only the bias light Pb is irradiated, the light-receiving device 30 detects the transmission light, and the logical value "0" is outputted.

Thus, if the light intensities of control pulses A and B exceed the turning point c individually and do not exceed the next turning point d in case of superimposing each other, NOR logic operation circuits whose logical result comes to "1" only when both logical inputs are "0" are obtained.

Next, in the case of setting the third control pulse γ to the light source 29, first the light source 29 biases the optical logic circuit in the optical bistable region S by the bias light Pb in the same way as described above. The initial state is supposed to have the logical value "1" at this time. In this state, if the logical operation inputs A and B are both "0", the light transmission state of the light transmission circuit 20 does not change in the same way as described before. Then the light-receiving device 30 receives the transmission light Pout in the high transmission state. Hereby, the logical output comes to "1". Next, if the logical operation input value A is "0", and logical operation input value B is "1", the light source 29 irradiates the bias light Pb superimposed by the control pulse A corresponding to the operation input value B. Because the superimposed light exceeds the turning point c in the optical bistable region S, the light transmission circuit 20 changes to the low transmission state. Consequently, if the control pulse A disappears and the transmission light returns to the bias light Pb, the light-receiving circuit 30 received the transmission light Pout in the low transmission state turns off. Hereby, the logical value "0" is outputted. Successively, if the operation input value A is "1", and operation input value B is "0", the light source 29 superimposes the control pulse B corresponding to the operation input value A on the bias light Pb, and irradiates it. Then the light-receiving device 30 detects the low transmission state of the light transmission circuit 20 in the same way above described. Hereby, the light-receiving device 30 turns off, and outputs the logical output value "0". Next, if the logical operation input values A and B are both "1", the light source 29 irradiates the bias light Pb superimposed by the control pulse A corresponding to the operation input value A and the control pulse B corresponding to the operation input value B. In this case, because the superimposed light exceeds the turning point d of the optical bistable region T, the light transmission circuit 20 further comes to the low transmission state. When the control pulses A and B disappear and only the bias light Pb is irradiated, the light transmission circuit 20 returns to the high transmission state passing through the path e from the turning point d. Hereby, the light-receiving device 30 received the transmission light Pout in the high transmission state turns on, and the logical value "1" is outputted.

Thus, if the light intensities of control pulses A and B exceed the turning point c individually and exceed the next turning point d in case of superimposing each other, equivalent logic operation circuits whose logical result comes to "1" when both logical inputs are "0" and "1" are obtained.

Next, the third control pulse γ is set to the light source 29 and the initial state of the optical logic circuit is set to be "0". That is, the light source 29 biases the optical logic circuit in the optical bistable region S by the bias light Pb, and makes the light transmission circuit 20 be in low transmission state by superimposing once a pulse light whose intensity exceeds the turning point c on the bias light Pb. In this state, if inputs whose operation input values A and B are both "0" are supplied to the light source, the light transmission state of the light transmission circuit 20 does not change in the biased state first. Then the light-receiving device 30 receives the transmission light Pout having been transmitted through the light transmission circuit 20 in the low transmission state. Hereby, the logical output comes to "0". Next, if the logical operation input value A is "0" and logical operation input value B is "1", the light source 29 irradiates the bias light Pb superimposed by the control pulse A corresponding to the operation input value B. Because the superimposed light exceeds the turning point c in the optical bistable region S but does not reach to the turning point d, the light transmission circuit 20 remains in the low transmission state and does not change. Consequently, if the control pulse A disappears and the transmission light returns to the bias light Pb, the light-receiving circuit 30 received the transmission light Pout having been transmitted through the light transmission circuit 20 in the low transmission state turns off. Hereby, the logical value "0" is outputted. Successively, if the operation input value A is "1" and operation input value B is "0", the light source 29 superimposes the control pulse B corresponding to the operation input value A on the bias light Pb, and irradiates it. Then the light-receiving device 30 detects the low transmission state of the light transmission circuit 20 in the same way above described. Hereby, the light-receiving device 30 turns off, and outputs the logical output value "0". Next, if the logical operation input values A and B are both "1", the light source 29 irradiates the bias light Pb superimposed by the control pulse A corresponding to the operation input value A and the control pulse B corresponding to the operation input value B. In this case, because the superimposed light exceeds the turning point d of the optical bistable region T, the light transmission circuit 20 further comes to the low transmission state as stated before. When the control pulses A and B disappear and only the bias light Pb is irradiated, the light transmission circuit 20 changes to the high transmission state passing through the path e from the turning point d. Hereby, the light-receiving device 30 received the transmission light Pout in the high transmission state turns on, and the logical value "1" is outputted.

Thus, if the light intensities of control pulses A and B exceed the turning point c individually and exceed the next turning point d in case of superimposing each other, and further the initial state of the light transmission circuit is supposed to have the value "0", AND logic operation circuits whose logical result comes to "1" when both logical input values are "1" are obtained.

Next, the fourth control pulse δ is set to the light source 29 and the initial state of the optical logic circuit is set to be "0" in the same way as mentioned before. First of all, if the operation input values A and B are both "0", the light transmission state of the light transmission circuit 20 does not change in the biased state. Then the light-receiving device 30 receives the transmission light Pout in the low transmission state. Hereby, the logical output comes to "0". Next, if the logical operation input value A is "0" and logical operation input value B is "1", the light source 29 irradiates the bias light Pb superimposed by the control pulse A corresponding to the operation input value B. Because the superimposed light exceeds the turning point d in the optical bistable region T, the light transmission circuit 20 changes from the low transmission state to the high transmission state when the incident light returns to the bias light only. Consequently, the light-receiving circuit 30 received the transmission light Pout having been transmitted through the light transmission circuit 20 in the high transmission state turns on. Hereby, the logical value "1" is outputted. Successively, if the operation input value A is "1" and operation input value B is "0", the light transmission circuit comes to the high transmission state in the same way above described. Hereby, the light-receiving device 30 turns on, and outputs the logical output value "1". Next, if the logical operation input values A and B are both "1", the light source 29 irradiates the bias light Pb superimposed by the control pulse A corresponding to the operation input value A and the control pulse B corresponding to the operation input value B. In this case, the superimposed light exceeds the turning point d of the optical bistable region T, and further rises along the linear region, however the turning point does not located in the linear region. Then the light transmission circuit 20 changes to the high transmission state when the incident light returns to the bias light Pb only in the same way as described above. Consequently, the light-receiving device 30 received the transmission light Pout having been transmitted through the light transmission circuit 20 in the high transmission state turns on, and the logical value "1" is outputted.

Thus, if the light intensities of control pulses A and B exceed the turning point d individually and further the initial state of the light transmission circuit is supposed to have the value "0", OR logic operation circuits whose logical result comes to "1" when both and either logical input values are "1" are obtained.

Figures 15, 16:
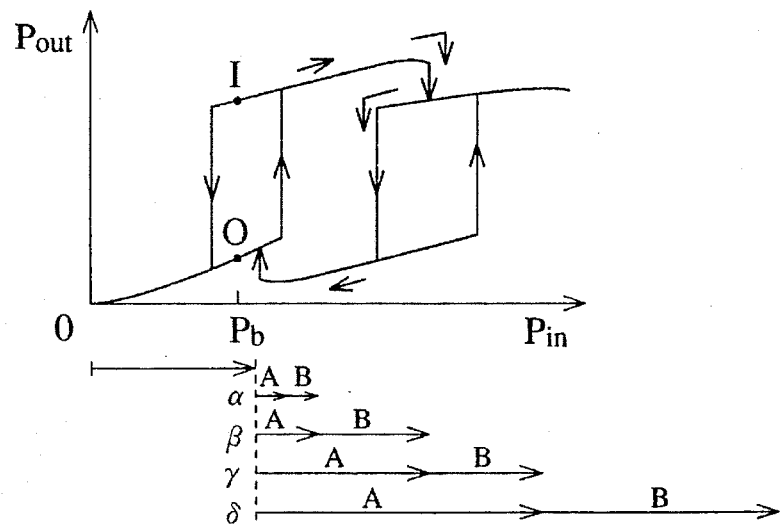
FIG. 15 is a drawing showing a principle of another embodiment of an optical logic operation circuit of the present invention.
FIG. 16 is a drawing showing the results of the operations of the embodiment shown in FIG. 15.

As above described, in this embodiment, each logical operation circuit of NAND, NOR, EQUIVALENT, AND and OR and the like can be constructed by applying the optical switching apparatus shown in FIG. 1 or FIG. 7 and setting two control pulses corresponding to the logical input values A and B in predetermined light intensities α~δ. Besides, the optical switching apparatus shown in FIG. 1 or FIG. 7 is applied to optical logic operation circuits in the embodiment, however optical switching apparatus using nonlinear etalon devices shown in FIG. 9~FIG. 12 can be applied also. In this case, AND logic circuits, OR logic circuit, exclusive-OR or NAND logic circuits, and NOR logic circuits are composed by setting the first control pulse α, the second control pulse β, the third control pulse γ, and the fourth control pulse δ respectively as shown in FIG. 15 and FIG. 16. Also, logical circuits are composed by setting the light intensities of the control pulses by making them correspond to each logic in the embodiment, however making wavelengths of the control pulses correspond to each logic by applying optical switching apparatus having multistable characteristics come from their different wavelengths can be executed in the present invention.

EMBODIMENT 5.

Figure 17:
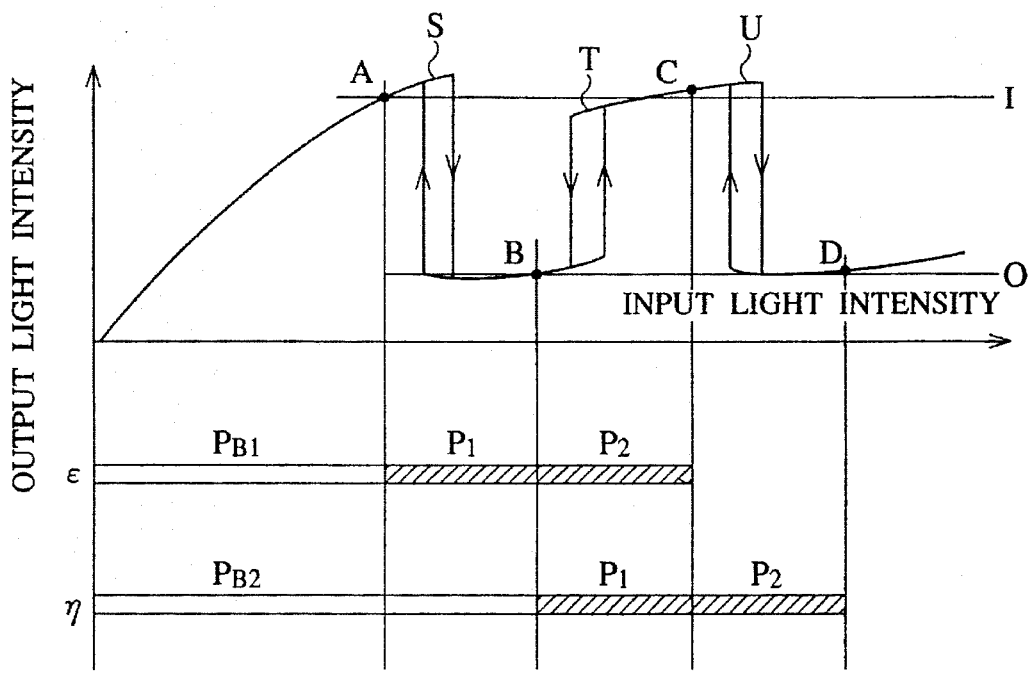
FIG. 17 is a drawing showing a principle of another embodiment of an optical logic operation circuit of the present invention.

FIG. 17 is a drawing showing an example of a principle of an embodiment of the optical logic operation circuits of the present invention. The embodiment of the optical logic operation circuits differs from the embodiment 4 in that the light intensity of bias light from the optical source 29 is set in any monostable region among bistable regions of the multistable characteristic of the light transmission circuit 20 and light intensities of the control pulses reach to the next monostable region. In detail, ε denotes a light intensity, in which the light intensity PB1 of a bias light is set in the monostable region of the high transmission state prior to the first optical bistable region S, and the light intensities of the control pulses P1 and P2 exceed individually the optical bistable region S in case of being superimposed on the bias light PB1 and exceed the second optical bistable region T in case of being superimposed each other on the bias light PB1 as shown in FIG. 17. η denotes a light intensity, in which the light intensity PB2 of a bias light is set in the monostable region between the first optical bistable region S and the second optical bistable region T, and the light intensities of the control pulses P1 and P2 exceed individually the optical bistable regions and reach to the next monostable region in case of being superimposed on the bias light PB2. FIG. 18(a) and FIG. 18(b) are drawings showing the results of operations to each input.

How the optical logic operation circuit works will now be described. First, the light source 29 biases the optical logic circuit at a point A in the monostable region prior to the first optical bistable region S by irradiating the bias light PB1. In this state, when the both logical operation inputs are "0", the control pulses P1 and P2 are not produced and only the bias light is irradiated. Then the transmission state of the light transmission circuit 20 comes to the high transmission state. Hereby, the light-receiving device 30 turns on, and the consequent logical output value "1" is outputted. Next, if one operation input value is "0", and the other operation input value is "1", the light source 29 irradiates the bias light PB1 superimposed by the control pulse P1 or P2 corresponding to the operation input values. Because the superimposed light exceeds the first optical bistable region S and reaches to the point B, The light transmission circuit 20 changes from the high transmission state to the low transmission state. Hereby, the light-receiving device 30 received the transmission light having transmitted the light transmission circuit 20 in the low transmission state turns off, and outputs the logical value "0" as the operation output. Successively, if the operation input values A and B are both "1", the light source 29 superimposes the control pulses P1 and P2 corresponding to each operation input value on the bias light PB1, and irradiates it. Then the light transmission circuit 20 exceeds the two optical bistable region S and T and reaches to the point C in a monostable region of the high transmission state. Hereby, the light-receiving device 30 turns on, and outputs the operational value "1".

On the other hand, if the light source 29 irradiates the bias light PB2 and biases the light transmission circuit 20 in a monostable region between the first optical bistable region S and the second optical bistable region T, the light transmission circuit 20 comes to the low transmission state, because the control pulses P1 and P2 are not produced and the incident light is composed of only the bias light PB2 as described above when the operation input values are both "0". Hereby, the light-receiving device 30 turns off and the operation result "0" is outputted. Next, if any one operation input value comes to "1", the light source 29 irradiates the bias light PB2 superimposed by the control pulse P1 or P2 corresponding to the operation input values. Then the light transmission circuit 20 transfers to the point C in the high transmission state monostable region exceeding the second optical bistable region T. So the light-receiving circuit 30 receives the high transmission state transmission light Pout, and turns on. Therefore the resulted logical operation comes to "1". Successively, if the operation input values are both "1", the light source 29 superimposes the two control pulses P1 and P2 on the bias light PB2, and irradiates it. Then the light transmission circuit 20 exceeds the two optical bistable regions T and U, and transfers to the point D in the low transmission state monostable region. Hereby, the light-receiving device 30 turns off, and the logical operation result "0" is outputted.

Figure 19:
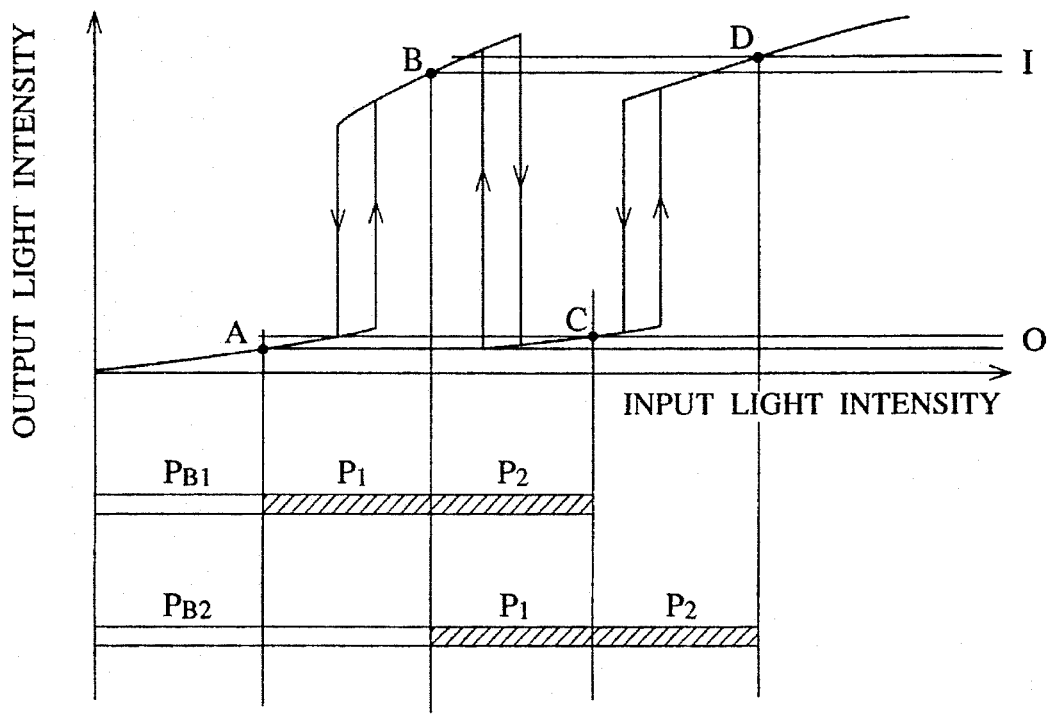
FIG. 19 is a drawing showing a principle of another embodiment of an optical logic operation circuit of the present invention.

As above described, the embodiment sets the light transmission circuit 20 in any one monostable region by the bias lights PB1 or PB2 from the light source 29, and changes it into other monostable regions by control pulses corresponding to operation input values. Therefore, the embodiment can form a logical operation circuit of the equivalent logic whose operation output comes to "1" when both operation input values are same values by setting the light transmission circuit 20 in a high transmission state monostable region by the bias light PB1. And further, the embodiment can form a logical operation circuit of the exclusive-OR whose operation output comes to "1" when both operation input values differ each other by setting the light transmission circuit 20 in a low transmission state monostable region by the bias light PB2. By the way, the embodiment forms an optical logic operation circuit by applying the optical switching apparatus shown in FIG. 1 or FIG. 7, the optical switching apparatus using the nonlinear etalon devices shown in FIG. 9 to FIG. 12 can be applied to the present invention. In this case, a logic operation circuit of the exclusive-OR can be formed using a low output power bias light PB1 as shown in FIG. 19, FIG. 20(a) and FIG. 20(b). Besides, though the embodiment was described about examples which set the light transmission circuit 20 into each region by varying the light intensities of bias lights, in the present invention the light transmission circuit 20 can be set into each region by the bias lights having different wavelengths, and the transmission state of it can be changed by control pulses having different wavelengths.

EMBODIMENT 6.

Figure 21:
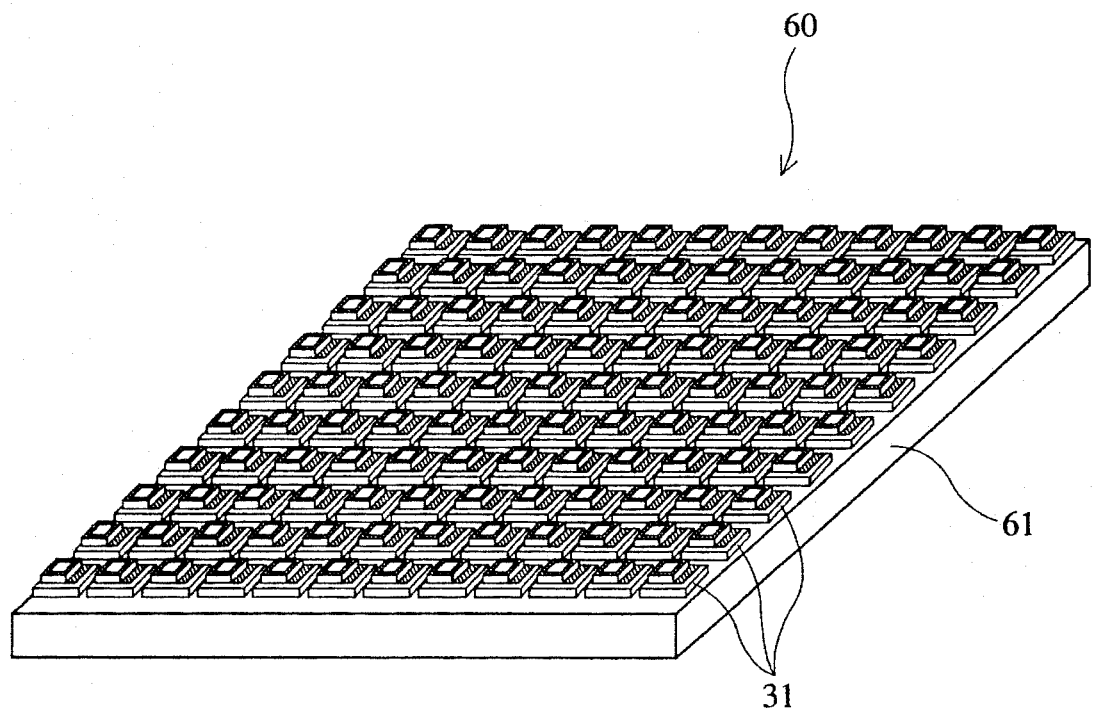
FIG. 21 is a perspective view showing a main part of an embodiment of a picture processor of the present invention.
Figure 22:
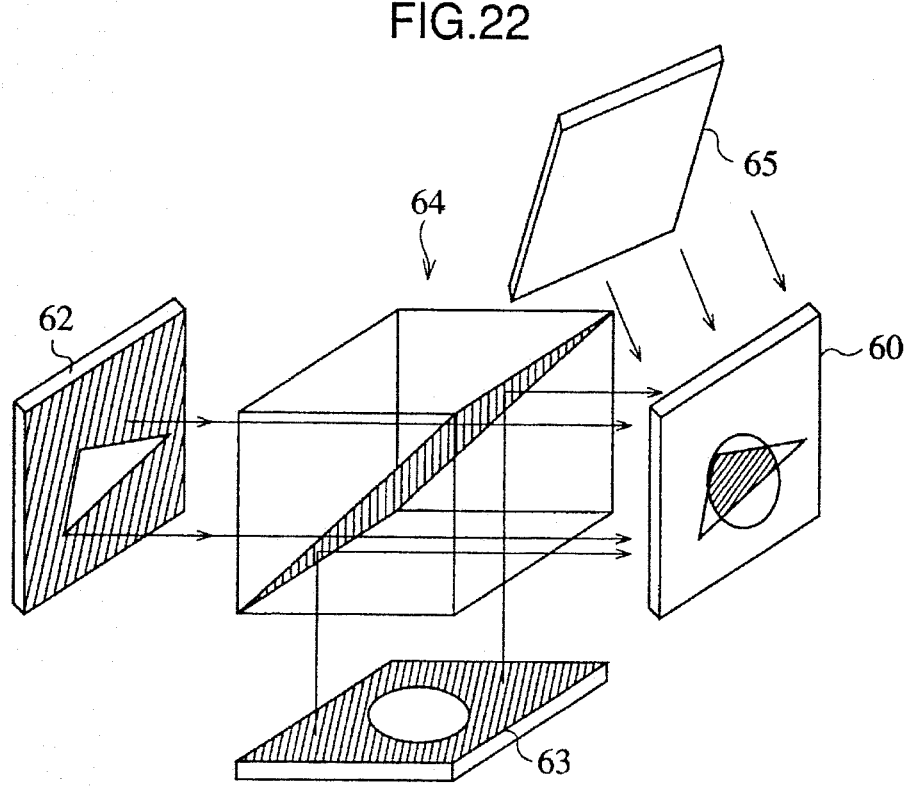
FIG. 22 is a schematic arrangement plan showing a composition of an embodiment of a picture processor of the present invention.

FIG. 21 is a drawing showing an embodiment's construction of a picture processor of the present invention. In FIG. 21, reference numeral 60 denotes a two-dimensional array in which light transmission circuits 31, e.g. shown in FIG. 7, are arranged on a substrate 61 in the two dimensional state as each picture element. In the embodiment, the input patterns of two pictures are irradiated on the two-dimensional array 60, and they are verified. For example in FIG. 22, a picture is memorized on the two-dimensional array 60, and in the picture only the common part of two patterns is inverted on the two-dimensional array 60 by utilizing the NAND logic. In FIG. 22, numeral 62 denotes the first picture input apparatus irradiating the first input pattern, and it is composed of e.g. liquid crystal switches which can adjust freely their light intensities. Numeral 63 denotes the second picture input apparatus irradiating the second input pattern. Numeral 64 denotes a half-mirror irradiating the first pattern and the second pattern from the first picture input apparatus 62 and the second picture input apparatus 63 respectively to the two-dimensional array 60. Numeral 65 denotes a light source irradiating bias lights, and irradiating predetermined pulse lights superimposed on the bias lights for resetting each picture element on the two-dimensional array 60.

How the picture processor works will now be described. First, the light source 65 irradiates a bias light to the two-dimensional array 60. The bias light biases each light transmission device on the two-dimensional array 60 to any one optical bistable region in each multistable region. Hereby, all devices 31 on the two-dimensional array 60 are set e.g. in the high transmission state. Next, the first and the second input patterns are irradiated from the first and the second picture input apparatus 62 and 63 through the half-mirror 64. In the case, the first and the second picture input apparatus 62 and 63 adjust the light intensities of the bright parts of the irradiating pattern (white parts in the drawing) in the range where the light intensities do not exceed individually the turning points of the optical bistable regions of devices 31 and exceed the turning points in case of being superimposed each other, and irradiate the lights. Consequently, in the two-dimensional array 60, the light transmission devices 31 in the parts where the bright parts of the first input pattern and the second input pattern are superimposed each other come to the low transmission state and inverts their brightness.

Figure 23:
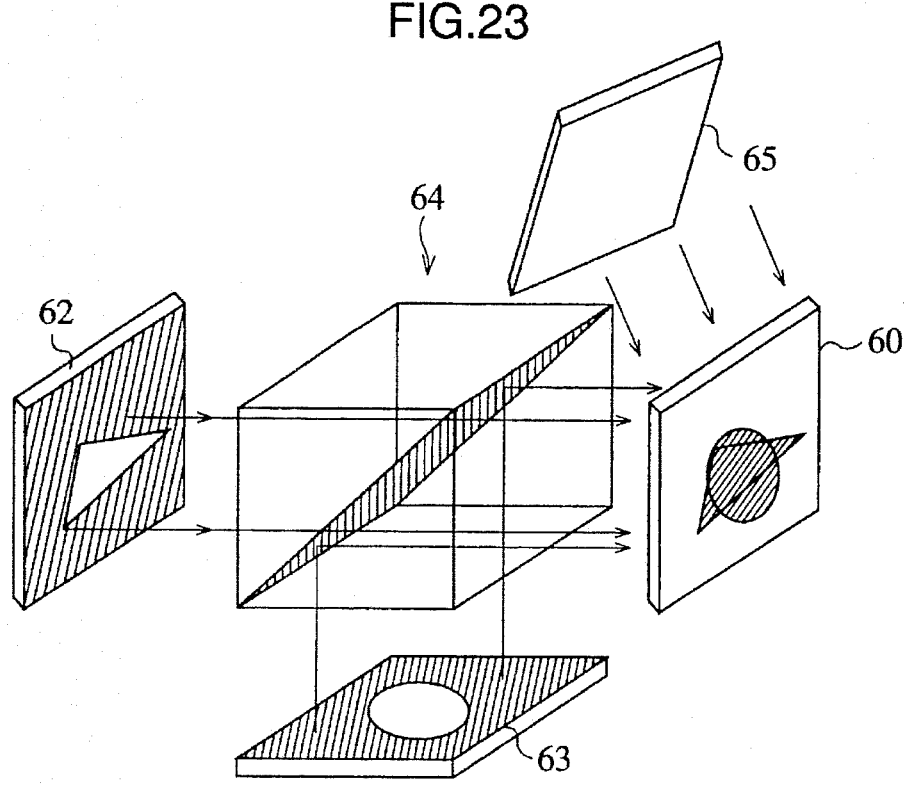
FIG. 23 is a schematic arrangement plan showing a composition of another embodiment of a picture processor of the present invention.

Next, the light source 65 irradiates a reset light and resets the two-dimensional array 60. Then, either bright part of the both patterns inverts its brightness and is memorized on the two-dimensional array 60 as shown in FIG. 23 by adjusting the first picture input apparatus 62 and the second picture input apparatus 63 to make the light intensities of the input patterns exceed individually the turning points of the optical bistable regions and not reach to the next turning points in case of being superimposed each other.

Figure 24:
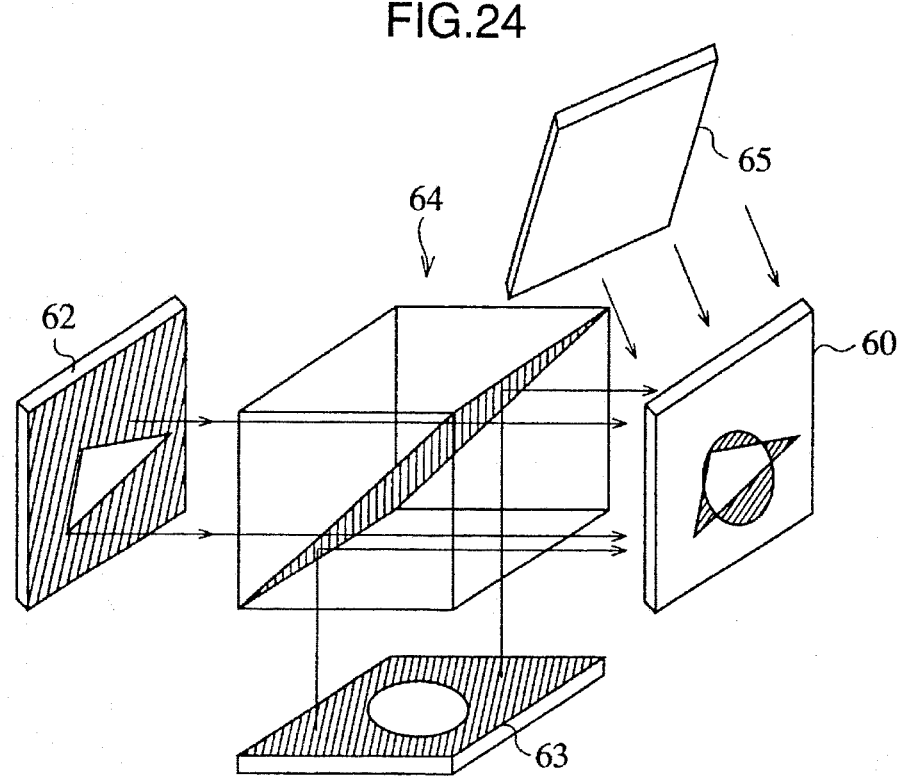
FIG. 24 is a schematic arrangement plan showing a composition of another embodiment of a picture processor of the present invention.

Similarly, only the parts which are bright parts of both patterns and are not superimposed invert their brightness and are memorized on the two-dimensional array 60 as shown in FIG. 24 by resetting the two-dimensional array 60 by irradiating a reset light from the light source 65 and by adjusting the first picture input apparatus 62 and the second picture input apparatus 63 to make the light intensities of the input patterns exceed individually the turning points of the optical bistable regions and reach to the next turning points in case of being superimposed each other.

As described above, the embodiment can execute verifications of two input patterns of every kind by the two-dimensional array 60 arranged in two-dimensional state. For example, it is possible to examine each product if it is fitted to the standards or not, by setting a sample pattern as the first input pattern and projecting patterns of the products to be examine on the second input pattern.

Figure 25:
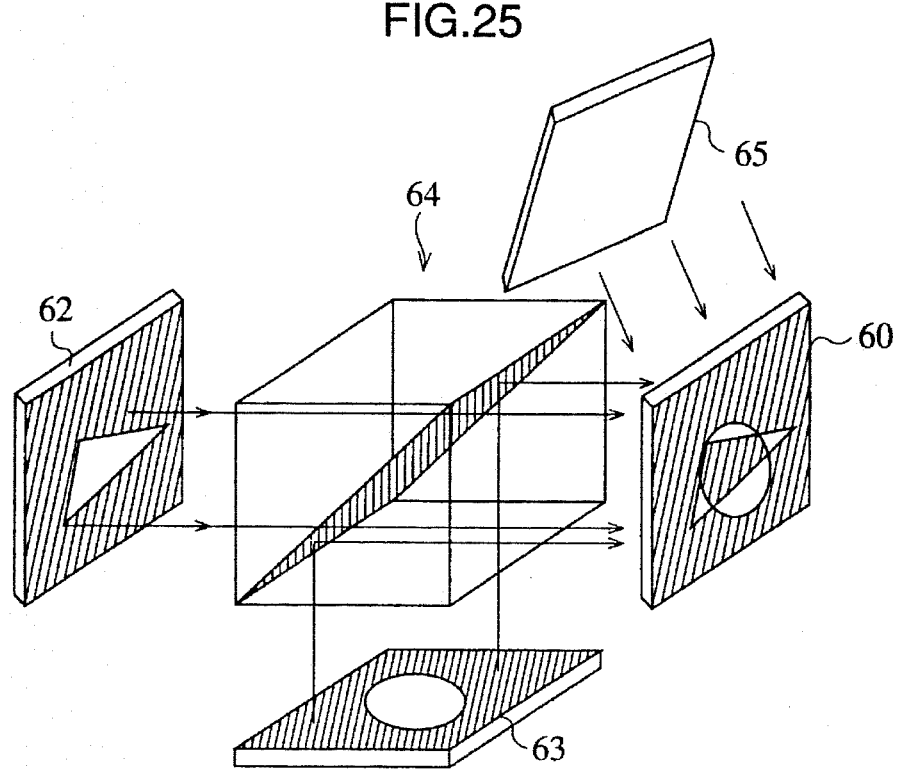
FIG. 25 is a schematic arrangement plan showing a composition of another embodiment of a picture processor of the present invention.

By the way, the embodiment is composed to be reset in the high transmission state of optical bistable region by a reset light, but it may be possible to be composed to reset the light transmission circuits 31 into the low transmission states of the optical bistable regions by adjusting the intensity of the reset light to exceed the turning point of the optical bistable regions. In this case, a verification picture can be obtained by making the light intensities of input patterns individually exceed the turning point of an optical bistable region and reach to the next turning point by superimposing each other; and only the parts in the verification picture except common parts of the both input patterns are inverted in brightness. Besides, the embodiment described above is composed to bias the bias light to any one optical bistable region and irradiate the input patterns to the two-dimensional array 60 with each light intensity described above, but may be composed to bias the bias light to any one monostable region and to irradiate the input patterns to the two-dimensional array 60 with light intensities exceeding optical bistable regions individually. In this case, the verification picture is obtained by setting the bias light in the high transmission monostable regions; and the parts in the verification picture except the parts where the two input patterns do not superimpose each other are inverted in brightness as shown in FIG. 25. This picture also can be obtained by applying e.g. the light transmission circuit in FIG. 9 using a nonlinear etalon to the two-dimensional array. As above mentioned, the embodiment of the picture processor of the invention can be composed by combining each embodiment 1–4 described above, and these combination are all included to the invention.

EMBODIMENT 7.

Figure 26:
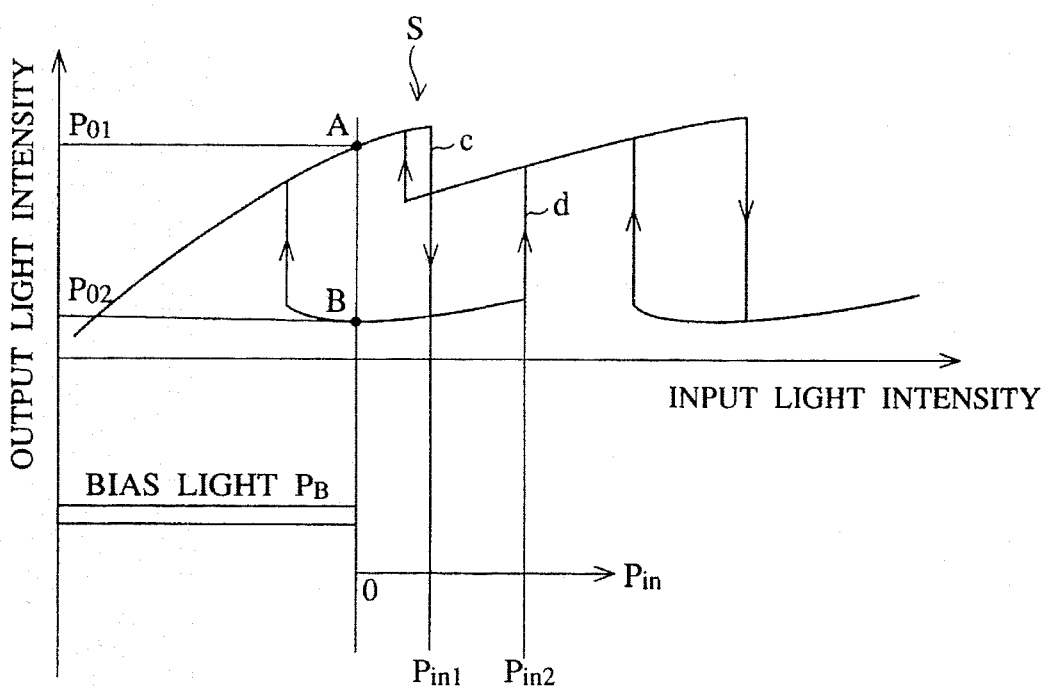
FIG. 26 is a drawing showing a principle of another embodiment of a picture processor of the present invention.

FIG. 26 is a drawing showing an principle of another embodiment of the picture processor of the invention. In the embodiment, the edge detection of input patterns etc. can be executed by applying the two-dimensional array 60 shown in FIG. 21. In this case, each light transmission device 31 on the two-dimensional array 60 has a multistable characteristic shown in FIG. 26 by adjusting each thickness of the multiple quantum well layers 34 and 36 or invert voltages. Further, the light intensity Pin of the picture input apparatus irradiating an input pattern to the two-dimensional array 60 is set to exceed the second turning point d. Also, the bias light PB is set in the first optical bistable region S, then makes all devices 31 on the two-dimensional array 60 the high transmission states. FIG. 27 is a drawing showing the operation of the edge detection.

Figure 28:
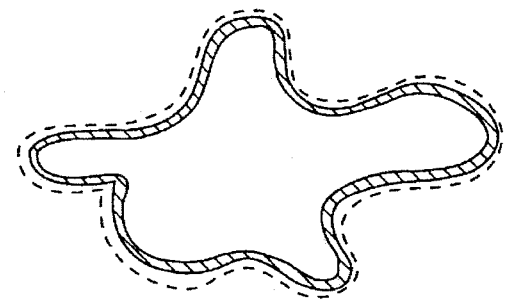
FIG. 28 is a drawing showing an example of a picture-processing pattern by the embodiment shown in FIG. 26.

How the picture processor works will now be described. First, the light source irradiates bias lights PB to the two-dimensional array 60 to change each light transmission device 31 in the high transmission state. Next, an input pattern e.g. shown in FIG. 27(a) is irradiated from a picture input apparatus. In the case, the edge parts of the input pattern irradiated on the two-dimensional array 60 have a light intensity inclination between bright parts and dark parts as shown in FIG. 27(b). Accordingly, the transmission states of the light transmission devices 31 on the two-dimensional array 60 located in the regions corresponding to the light intensity Pin 1–Pin 2 are inverted from the high transmission state to the low transmission state, and the inversion can be detected as shown in FIG. 27(c). FIG. 28 is a plan showing the result.

Figure 29:
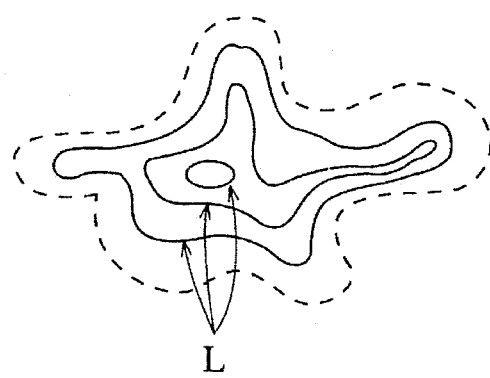
FIG. 29 is a drawing showing another example of a picture-processing pattern by the embodiment shown in FIG. 26.

As described above, the embodiment can abstract edges of picture utilizing the two dimensional array 60. Further, equal light intensity lines L of an input pattern shown in FIG. 29 can be obtained by irradiating the same input pattern at plural times with changing bias light intensities PB successively without resetting. Also, even if the light intensity of an input pattern Pin is unique as shown in FIG. 30, the edge abstraction in which only the edge parts are dark can be executed because the light transmission devices located near the edge position of the input pattern are irradiated only a part of them so that their received light amount is less than that of the inner devices of the input pattern.

By the way, the embodiment utilizes the optical equivalent logic operation when the bias state is positioned in a bistable region, but the abstracted pictures whose edge parts are made to be in the high transmission states can be obtained by utilizing the exclusive-OR. Besides the description was made about the case of positioning bias state in a bistable region in the embodiment, but the invention can be applicable to the case of biasing light transmission devices in monostable region.

What is claimed is:

1. An optical switching apparatus comprising:

a light transmission device having a plurality of optical bistable devices which are arranged in optical series, said light transmission device having an optical multistable characteristic including a plurality of optical bistable regions, at least one of the plurality of optical bistable regions having two different transmission states which are reversibly switched between in response to a change in intensity of an incident light:

an incident light producing device for irradiating a light into the light transmission device, said incident light producing device producing a bias light having a light intensity corresponding to one of the optical bistable regions, said incident light producing device further superimposing a plurality of control pulse lights having different light intensities on the bias light; and a light-receiving device for detecting a transmission state of said light transmission device by receiving a light produced by said incident light producing device and transmitted through said light transmission device.

2. An apparatus according to claim 1, wherein one of the optical bistable regions has two light transmission states of a high transmission state and a low transmission state to said incident light, and said incident light producing device produces a bias light having an intensity corresponding to the one of the optical bistable regions, and superimposes two control pulse lights having different intensities on the bias light.

3. An apparatus according to claim 1, wherein said plurality of optical bistable devices include one or more semiconductor quantum well light absorption layers.

4. An apparatus according to claim 1, wherein said plurality of optical bistable devices include one or more nonlinear etalon devices composed by providing a nonlinear refractive index medium between two mirrors.

5. An apparatus according to claim 1, wherein said light transmission device includes an integrated device having the plurality of optical bistable devices laminated to each other.

6. An apparatus according to claim 8, wherein said integrated device is composed of one of an n-i-p-i-n type integrated device and a p-i-n-i-p type integrated device, each comprising two semiconductor quantum well light absorption regions.

7. An apparatus according to claim 5, wherein said integrated device has two nonlinear etalon devices laminated with a dielectric spacer layer provided between them.

8. An apparatus according to claim 5, wherein said integrated device has two nonlinear etalon devices sharing a mirror of the etalon devices.

9. An optical logic operation circuit for performing a logic operation on at least two operation input value comprising:

a light transmission device having a plurality of optical bistable devices which are arranged in optical series, said light transmission device having an optical multistable characteristic including a plurality of optical bistable regions, at least one of the plurality of the optical bistable regions having two different transmission states which are reversibly switched in response to a change in intensity of an incident light:

an incident light producing device for irradiating a light into the light transmission device, said incident light producing device producing a bias light having a light intensity corresponding to one of the optical bistable regions, said incident light producing device further superimposing a plurality of control pulse lights having predetermined light intensities on the bias light; and a light-receiving device for detecting a transmission state of said light transmission device by receiving a light produced by the incident light producing device and transmitted through said light transmission device: wherein said incident light producing device produces the incident light by superimposing said control pulse lights based on the at least two operation input values on said bias light, said light transmission device enters a transmission state dependent on a logical combination of the at least two operation input values, and said light-receiving device outputs a detected result of a light transmitted through said light transmission device as a logical operation output value.

10. An optical logic operation circuit according to claim 9, wherein said plural control pulse lights have light intensities which do not exceed individually a region changing a transmission state of an optical bistable region and exceed the region changing a transmission state of the optical bistable region by superimposing each other.

11. An optical logic operation circuit according to claim 9, wherein said plural control pulse lights have light intensities which exceed individually a region changing a transmission state of an optical bistable region and do not reach to the next optical bistable region by superimposing each other.

12. An optical logic operation circuit according to claim 9, wherein said plural control pulse lights have light intensities which exceed individually a region changing a transmission state of an optical bistable region and do not individually reach to the next optical bistable region, further reach to the next optical bistable region by superimposing each other.

13. An optical logic operation circuit according to claim 9, wherein said plural control pulse lights have light intensities which individually reach to the next optical bistable region and do not exceed individually a region changing a transmission state of the next optical bistable region, further exceed the region changing a transmission state of the next optical bistable region by superimposing each other.

14. An optical logic operation circuit according to claim 9, wherein said plural control pulse lights have light intensities which exceed individually a region changing a transmission state of the next optical bistable region.

15. An optical logic operation circuit for performing a logic operation on at least two operation input values, comprising:

a light transmission device having a plurality of optical bistable devices which are arranged in optical series, said light transmission device having an optical characteristic including a plurality of monostable regions each having one of a high transmission state and a low transmission state;

an incident light producing device for irradiating a light into the light transmission device, said incident light producing device producing a bias light having a light intensity corresponding to one of the monostable regions, and superimposing plural control pulse lights having light intensities on the bias light corresponding to the other monostable regions; and a light-receiving device for detecting a transmission state of said light transmission device by receiving the transmission light produced by the incident light producing device and transmitted through said light transmission device; wherein said incident light producing device produces the incident light by superimposing said control pulse lights based on the at least two operation input values on said bias light, said light transmission device enters a transmission state dependent on a logical combination of the at least two operation input values, and said light-receiving device outputs a detected result of the transmission light from said light transmission device as a logical operation output value.

16. A picture processor comprising:

a two-dimensional array composed by arranging light transmission devices in a two-dimensional state as each picture element, said light transmission devices having an optical multistable characteristic including plural optical bistable regions each having at least two different transmission states which are reversively switched in response to a change in intensity of an incident light, a bias light producing means for irradiating a bias light to the two-dimensional array, said bias light having a light intensity corresponding to one of the optical bistable regions of each light transmission device, a picture input means for simultaneously irradiating input patterns from at least two pictures to said two-dimensional array each in a predetermined light intensity, forming a processed picture in the two-dimensional array by combining light intensities irradiated thereon, thereby causing some of the light transmission devices to change transmission states, and a reset means for irradiating a pulse light to each light transmission device of said two-dimensional array for resetting an optical bistable region to one transmission state.

17. A picture processor according to claim 16, wherein said picture input means irradiates input pattern lights to said two-dimensional array, said input pattern lights have light intensities, the intensities corresponding to bright parts of said input patterns do not individually exceed a region changing a transmission state of an optical bistable region and exceed the region changing a transmission state of the optical bistable region by superimposing each input pattern light.

18. A picture processor according to claim 16, wherein said picture input means irradiates input pattern lights to said two-dimensional array, said input pattern lights have light intensities, the intensities corresponding to bright parts of said input patterns individually exceed a region changing a transmission state of an optical bistable region and do not reach to the next optical bistable region by superimposing each input pattern light.

19. A picture processor according to claim 16, wherein said picture input means irradiates input pattern lights to said two-dimensional array, said input pattern lights have light intensities, the intensities corresponding to bright parts of said input patterns individually exceed a region changing a transmission state of an optical bistable region and do not reach to the next optical bistable region, further the intensities corresponding to bright parts of said input patterns reach to the next optical bistable region by superimposing each input pattern light.

20. A picture processor according to claim 16, wherein said picture input means irradiates input pattern lights to said two-dimensional array, said input pattern lights have such light intensities that the intensities corresponding to bright parts of said input patterns individually reach to the next optical bistable region and do not exceed a region changing a transmission state of the next optical bistable region, and that the intensities corresponding to bright parts of said input patterns exceed the region changing a transmission state of said next optical bistable region by superimposing each input pattern light.

21. A picture processor according to claim 16, wherein said picture input means irradiates input pattern lights to said two-dimensional array, said input pattern lights have such light intensities that the intensities corresponding to bright parts of said input patterns individually exceed a region changing the transmission state of the next optical bistable region.

22. A picture processor according to claim 16, wherein said bias light producing means irradiates a bias light to said two-dimensional array, and said bias light has a light intensity corresponding to one monostable region among the optical bistable regions in the multistable characteristic of said light transmission means.

23. A picture processor comprising:

- a two-dimensional array composed by arranging light transmission devices in a two-dimensional state as each picture element, said light transmission devices having an optical multistable characteristic including plural optical bistable regions each having at least two different transmission states which are reversively switched in response to a change in intensity of an incident light,

- a bias light producing means for irradiating a bias light to the two-dimensional array, said bias light having a light intensity corresponding to one of the optical bistable regions of each light transmission device,

- a picture input means for changing light intensities of effective parts of input patterns from a picture and for irradiating the changed input patterns to said two-dimensional array, forming a processed picture in the two-dimensional array by combining light intensities irradiated thereon, thereby causing some of the light transmission devices to change transmission states, and

- a reset means for irradiating a pulse light to each light transmission device of said two-dimensional array for resetting an optical bistable region to one transmission state.

* * * * *